US012726998B2

(12) United States Patent
Matsumura et al.

(10) Patent No.: US 12,726,998 B2
(45) Date of Patent: Sep. 1, 2026

(54) TERMINAL, BASE STATION, RADIO COMMUNICATION SYSTEM, AND RADIO COMMUNICATION METHOD

(71) Applicant: NTT DOCOMO, INC., Tokyo (JP)

(72) Inventors: Yuki Matsumura, Tokyo (JP); Shohei Yoshioka, Tokyo (JP); Hiroki Harada, Tokyo (JP); Satoshi Nagata, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 273 days.

(21) Appl. No.: 18/727,366

(22) PCT Filed: Jan. 11, 2022

(86) PCT No.: PCT/JP2022/000559

§ 371 (c)(1),
(2) Date: Jul. 9, 2024

(87) PCT Pub. No.: WO2023/135646

PCT Pub. Date: Jul. 20, 2023

(65) Prior Publication Data

US 2025/0175991 A1 May 29, 2025

(51) Int. Cl.
*H04W 72/231* (2023.01)
*H04L 1/00* (2006.01)
*H04W 72/0453* (2023.01)
*H04W 72/12* (2023.01)

(52) U.S. Cl.
CPC ......... *H04W 72/231* (2023.01); *H04L 1/0003* (2013.01); *H04W 72/0453* (2013.01); *H04W 72/12* (2013.01)

(58) Field of Classification Search
CPC ........... H04W 72/0453; H04W 72/231; H04W 72/12; H04L 1/0003
See application file for complete search history.

(56) References Cited

U.S. PATENT DOCUMENTS

2023/0083445 A1* 3/2023 Awadin ................ H04L 5/0044 370/329

OTHER PUBLICATIONS

Huawei, "New Work Item on NR support of Multicast and Broadcast Services", RP-193248, 3GPP TSG RAN Meeting #86,Sitges, Spain, Dec. 9-12, 2019; Cited in the Specification.
Samsung, "On mechanisms to support group scheduling for RRC_CONNECTED UEs", R1_2103260, 3GPP TSG RAN WG1 #104b-e, e-Meeting, Apr. 12-20, 2021; Cited in the ISR.
Chengdu TD Tech, TD Tech "Effects of NR MBS on PDSCH and PDCCH", R1-2007641, 3GPP TSG RAN WG1 Meeting #103-e Electronic meeting, Oct. 26-Nov. 13, 2020; Cited in the ISR.
Huawei, "Introduction of NR Multicast and Broadcast Services", R1-2112940, 3GPP TSG-RAN WG1 Meeting #107-e e-Meeting, Nov. 11-19, 2021; Cited in the ISR.
International Search Report of a international application PCT/JP2021/045712 mailed on Jul. 19, 2022.

* cited by examiner

*Primary Examiner* — Gbemileke J Onamuti
(74) *Attorney, Agent, or Firm* — METROLEX IP LAW GROUP, PLLC; Robert L. Scott, Esq.

(57) ABSTRACT

A terminal includes a receiving unit that receives data in data delivery to a plurality of terminals via a downlink channel, and a control unit that performs specific processing related to the data delivery based on downlink control information for multicast newly defined for the data delivery.

8 Claims, 14 Drawing Sheets

200
210
RADIO SIGNAL TRANSMITTING AND RECEIVING UNIT
220
AMPLIFIER UNIT
230
MODULATION AND DEMODULATION UNIT
240
CONTROL SIGNAL AND REFERENCE SIGNAL PROCESSING UNIT
250
ENCODING AND DECODING UNIT
260
DATA TRANSMITTING AND RECEIVING UNIT
270
CONTROL UNIT

FIG. 6
PTM transmission scheme 1
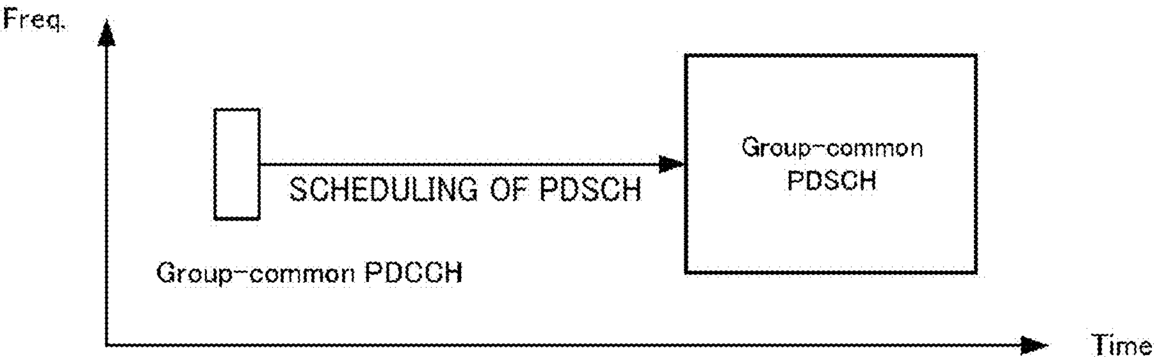
PTM transmission scheme 2
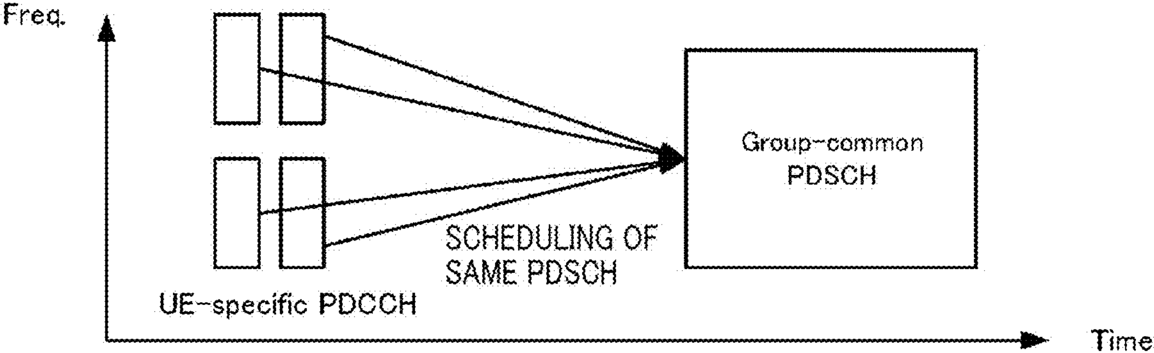

FIG. 7

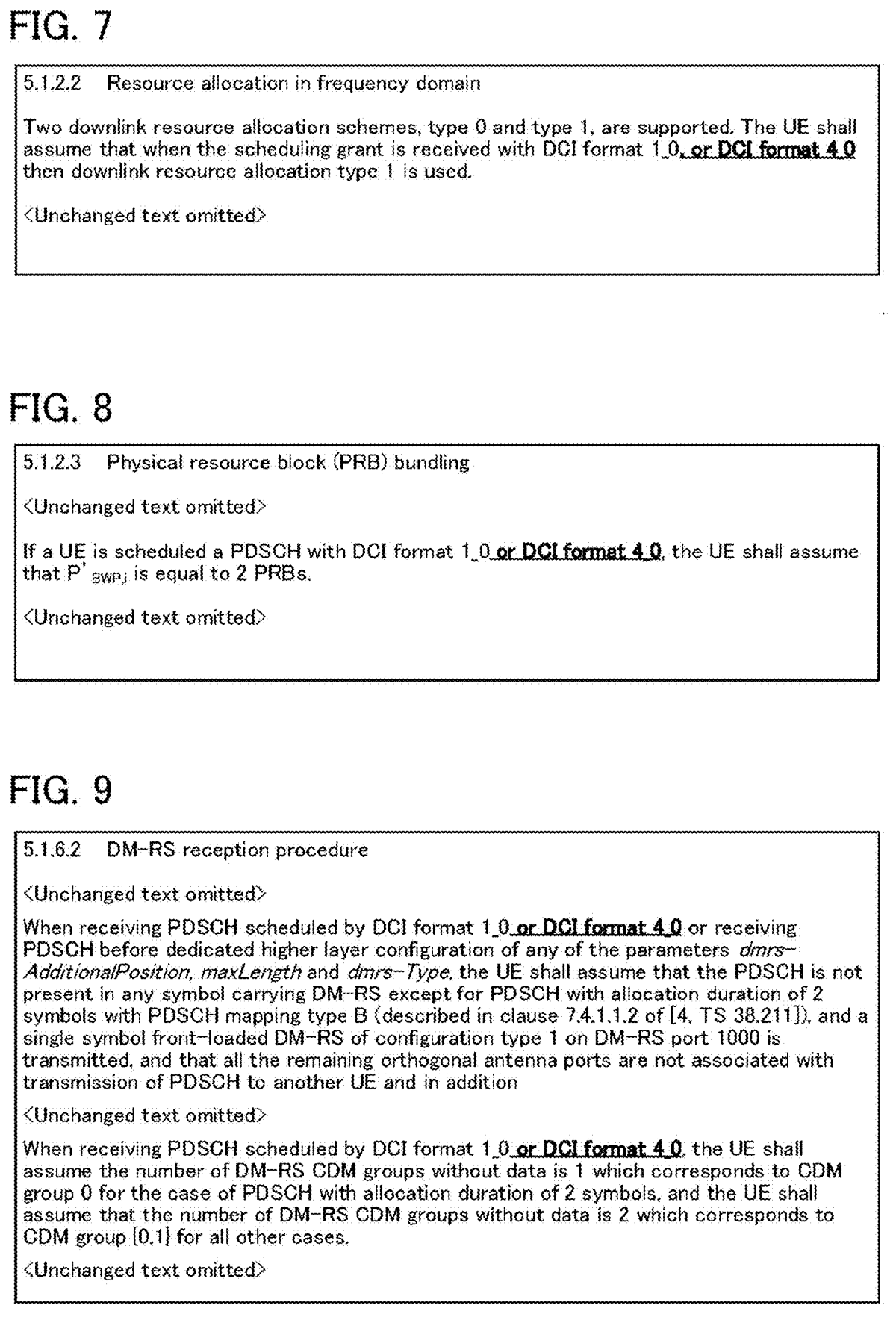

5.1.2.2 Resource allocation in frequency domain

Two downlink resource allocation schemes, type 0 and type 1, are supported. The UE shall assume that when the scheduling grant is received with DCI format 1_0, or DCI format 4_0 then downlink resource allocation type 1 is used.

<Unchanged text omitted>

FIG. 8

5.1.2.3 Physical resource block (PRB) bundling

<Unchanged text omitted>

If a UE is scheduled a PDSCH with DCI format 1_0 or DCI format 4_0, the UE shall assume that $P'_{BWP,i}$ is equal to 2 PRBs.

<Unchanged text omitted>

FIG. 9

5.1.6.2 DM-RS reception procedure

<Unchanged text omitted>

When receiving PDSCH scheduled by DCI format 1_0 or DCI format 4_0 or receiving PDSCH before dedicated higher layer configuration of any of the parameters *dmrs-AdditionalPosition, maxLength* and *dmrs-Type*, the UE shall assume that the PDSCH is not present in any symbol carrying DM-RS except for PDSCH with allocation duration of 2 symbols with PDSCH mapping type B (described in clause 7.4.1.1.2 of [4, TS 38.211]), and a single symbol front-loaded DM-RS of configuration type 1 on DM-RS port 1000 is transmitted, and that all the remaining orthogonal antenna ports are not associated with transmission of PDSCH to another UE and in addition <Unchanged text omitted>

When receiving PDSCH scheduled by DCI format 1_0 or DCI format 4_0, the UE shall assume the number of DM-RS CDM groups without data is 1 which corresponds to CDM group 0 for the case of PDSCH with allocation duration of 2 symbols, and the UE shall assume that the number of DM-RS CDM groups without data is 2 which corresponds to CDM group {0,1} for all other cases.

<Unchanged text omitted>

FIG. 10

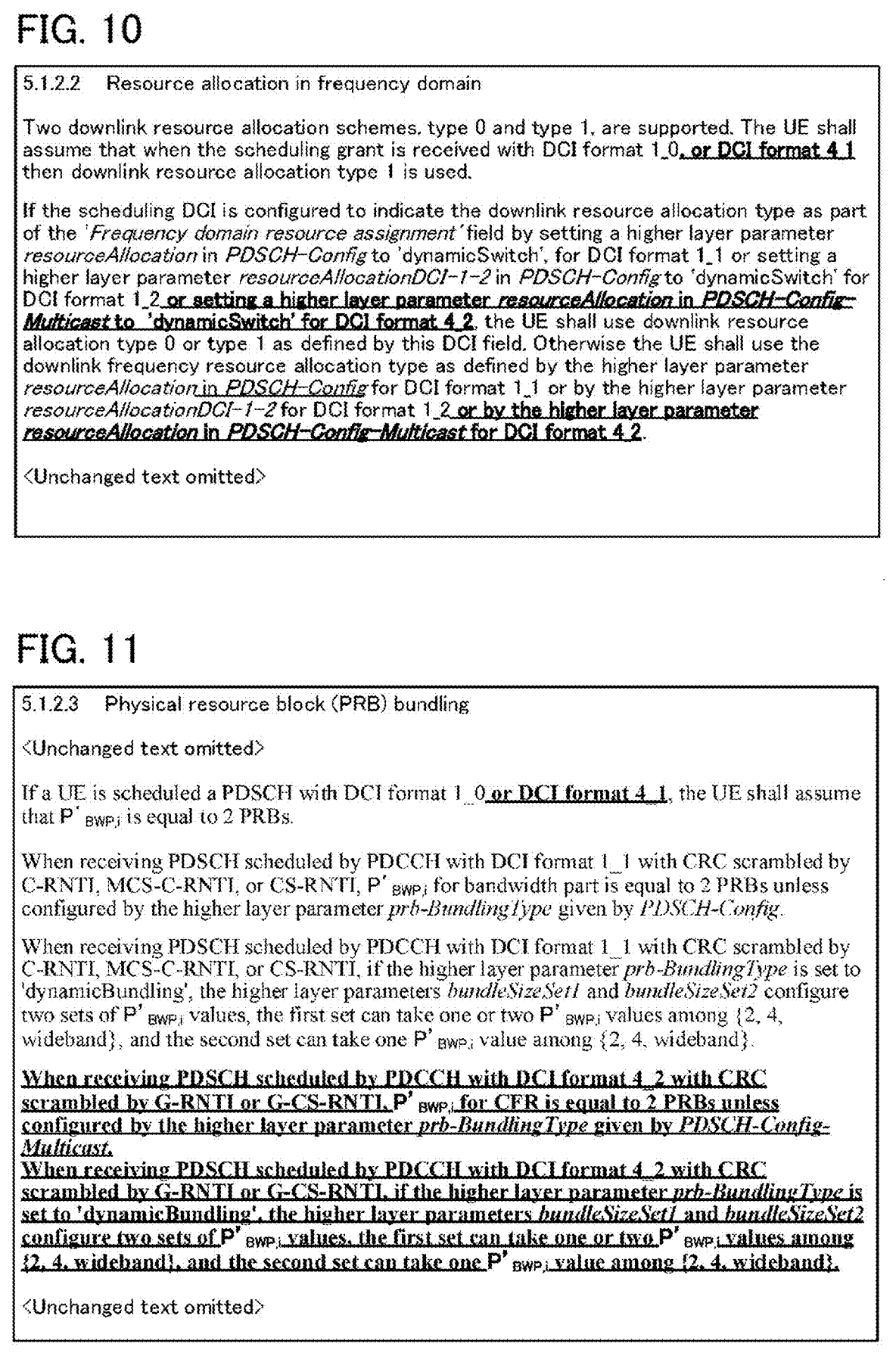

5.1.2.2 Resource allocation in frequency domain

Two downlink resource allocation schemes, type 0 and type 1, are supported. The UE shall assume that when the scheduling grant is received with DCI format 1_0, or DCI format 4_1 then downlink resource allocation type 1 is used.

If the scheduling DCI is configured to indicate the downlink resource allocation type as part of the '*Frequency domain resource assignment*' field by setting a higher layer parameter *resourceAllocation* in *PDSCH-Config* to 'dynamicSwitch', for DCI format 1_1 or setting a higher layer parameter *resourceAllocationDCI-1-2* in *PDSCH-Config* to 'dynamicSwitch' for DCI format 1_2 **or setting a higher layer parameter *resourceAllocation* in *PDSCH-Config-Multicast* to 'dynamicSwitch' for DCI format 4_2**, the UE shall use downlink resource allocation type 0 or type 1 as defined by this DCI field. Otherwise the UE shall use the downlink frequency resource allocation type as defined by the higher layer parameter *resourceAllocation* in *PDSCH-Config* for DCI format 1_1 or by the higher layer parameter *resourceAllocationDCI-1-2* for DCI format 1_2 **or by the higher layer parameter *resourceAllocation* in *PDSCH-Config-Multicast* for DCI format 4_2**.

<Unchanged text omitted>

FIG. 11

5.1.2.3 Physical resource block (PRB) bundling

<Unchanged text omitted>

If a UE is scheduled a PDSCH with DCI format 1_0 or DCI format 4_1, the UE shall assume that $P'_{BWP,i}$ is equal to 2 PRBs.

When receiving PDSCH scheduled by PDCCH with DCI format 1_1 with CRC scrambled by C-RNTI, MCS-C-RNTI, or CS-RNTI, $P'_{BWP,i}$ for bandwidth part is equal to 2 PRBs unless configured by the higher layer parameter *prb-BundlingType* given by *PDSCH-Config*.

When receiving PDSCH scheduled by PDCCH with DCI format 1_1 with CRC scrambled by C-RNTI, MCS-C-RNTI, or CS-RNTI, if the higher layer parameter *prb-BundlingType* is set to 'dynamicBundling', the higher layer parameters *bundleSizeSet1* and *bundleSizeSet2* configure two sets of $P'_{BWP,i}$ values, the first set can take one or two $P'_{BWP,i}$ values among {2, 4, wideband}, and the second set can take one $P'_{BWP,i}$ value among {2, 4, wideband}.

**When receiving PDSCH scheduled by PDCCH with DCI format 4_2 with CRC scrambled by G-RNTI or G-CS-RNTI, $P'_{BWP,i}$ for CFR is equal to 2 PRBs unless configured by the higher layer parameter *prb-BundlingType* given by *PDSCH-Config-Multicast*.**
**When receiving PDSCH scheduled by PDCCH with DCI format 4_2 with CRC scrambled by G-RNTI or G-CS-RNTI, if the higher layer parameter *prb-BundlingType* is set to 'dynamicBundling', the higher layer parameters *bundleSizeSet1* and *bundleSizeSet2* configure two sets of $P'_{BWP,i}$ values, the first set can take one or two $P'_{BWP,i}$ values among {2, 4, wideband}, and the second set can take one $P'_{BWP,i}$ value among {2, 4, wideband}.**

<Unchanged text omitted>

FIG. 12

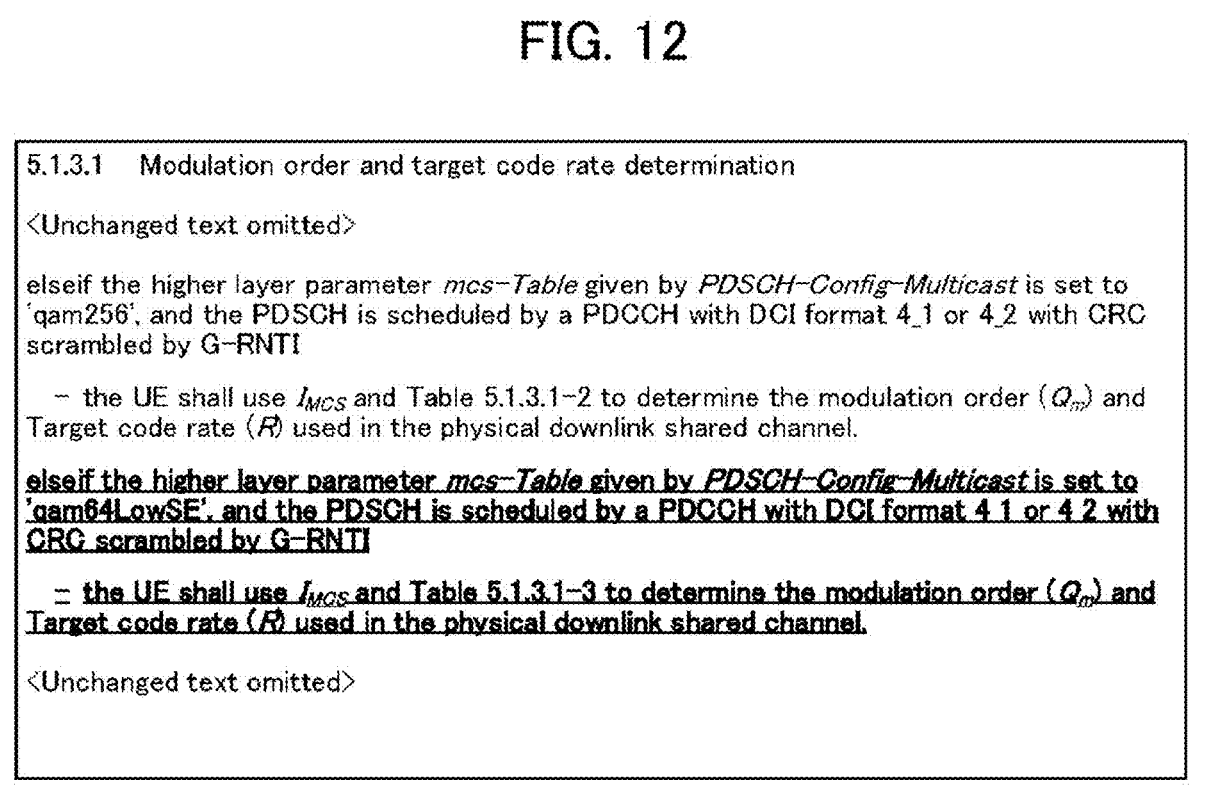

5.1.3.1 Modulation order and target code rate determination

<Unchanged text omitted> elseif the higher layer parameter *mcs-Table* given by *PDSCH-Config-Multicast* is set to 'qam256', and the PDSCH is scheduled by a PDCCH with DCI format 4_1 or 4_2 with CRC scrambled by G-RNTI – the UE shall use $I_{MCS}$ and Table 5.1.3.1-2 to determine the modulation order ($Q_m$) and Target code rate ($R$) used in the physical downlink shared channel.

**elseif the higher layer parameter *mcs-Table* given by *PDSCH-Config-Multicast* is set to 'qam64LowSE', and the PDSCH is scheduled by a PDCCH with DCI format 4_1 or 4_2 with CRC scrambled by G-RNTI**

– the UE shall use $I_{MCS}$ and Table 5.1.3.1-3 to determine the modulation order ($Q_m$) and Target code rate ($R$) used in the physical downlink shared channel.

<Unchanged text omitted>

FIG. 13

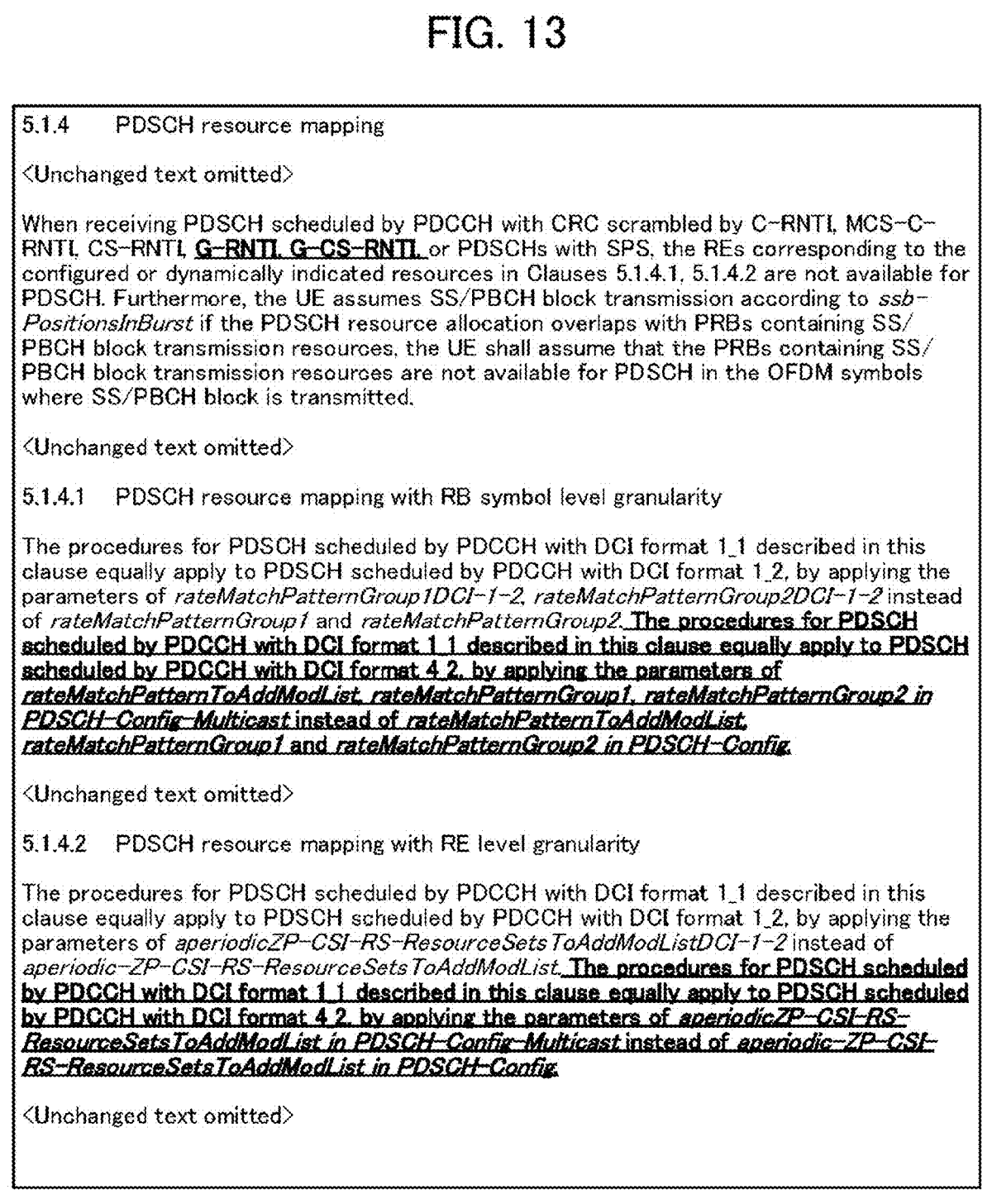

5.1.4 PDSCH resource mapping

<Unchanged text omitted>

When receiving PDSCH scheduled by PDCCH with CRC scrambled by C-RNTI, MCS-C-RNTI, CS-RNTI, G-RNTI, G-CS-RNTI, or PDSCHs with SPS, the REs corresponding to the configured or dynamically indicated resources in Clauses 5.1.4.1, 5.1.4.2 are not available for PDSCH. Furthermore, the UE assumes SS/PBCH block transmission according to *ssb-PositionsInBurst* if the PDSCH resource allocation overlaps with PRBs containing SS/PBCH block transmission resources, the UE shall assume that the PRBs containing SS/PBCH block transmission resources are not available for PDSCH in the OFDM symbols where SS/PBCH block is transmitted.

<Unchanged text omitted>

5.1.4.1 PDSCH resource mapping with RB symbol level granularity

The procedures for PDSCH scheduled by PDCCH with DCI format 1_1 described in this clause equally apply to PDSCH scheduled by PDCCH with DCI format 1_2, by applying the parameters of *rateMatchPatternGroup1DCI-1-2*, *rateMatchPatternGroup2DCI-1-2* instead of *rateMatchPatternGroup1* and *rateMatchPatternGroup2*. **The procedures for PDSCH scheduled by PDCCH with DCI format 1_1 described in this clause equally apply to PDSCH scheduled by PDCCH with DCI format 4_2, by applying the parameters of *rateMatchPatternToAddModList, rateMatchPatternGroup1, rateMatchPatternGroup2 in PDSCH-Config-Multicast* instead of *rateMatchPatternToAddModList, rateMatchPatternGroup1* and *rateMatchPatternGroup2 in PDSCH-Config*.**

<Unchanged text omitted>

5.1.4.2 PDSCH resource mapping with RE level granularity

The procedures for PDSCH scheduled by PDCCH with DCI format 1_1 described in this clause equally apply to PDSCH scheduled by PDCCH with DCI format 1_2, by applying the parameters of *aperiodicZP-CSI-RS-ResourceSetsToAddModListDCI-1-2* instead of *aperiodic-ZP-CSI-RS-ResourceSetsToAddModList*. **The procedures for PDSCH scheduled by PDCCH with DCI format 1_1 described in this clause equally apply to PDSCH scheduled by PDCCH with DCI format 4_2, by applying the parameters of *aperiodicZP-CSI-RS-ResourceSetsToAddModList in PDSCH-Config-Multicast* instead of *aperiodic-ZP-CSI-RS-ResourceSetsToAddModList in PDSCH-Config*.**

<Unchanged text omitted>

FIG. 14

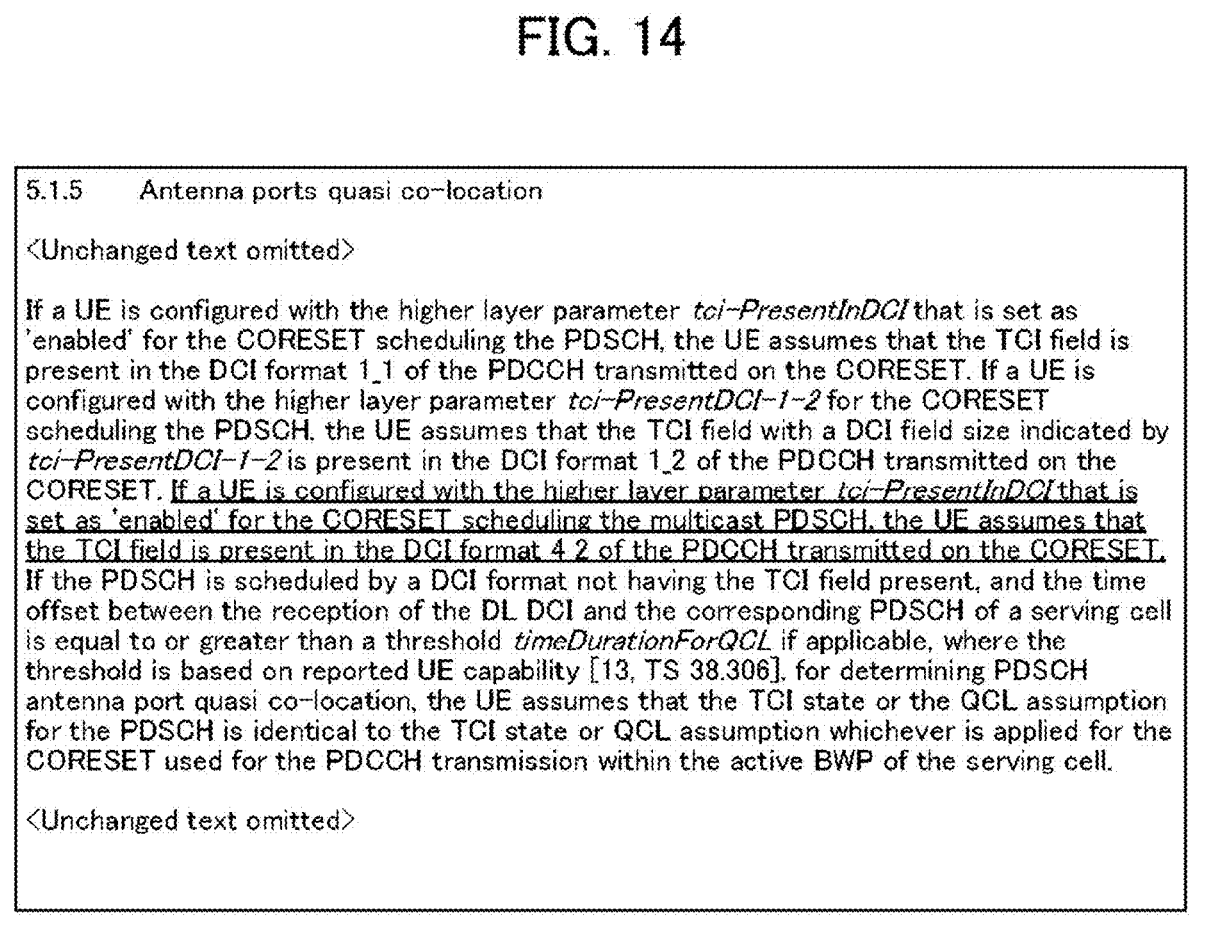

5.1.5 Antenna ports quasi co-location

<Unchanged text omitted>

If a UE is configured with the higher layer parameter *tci-PresentInDCI* that is set as 'enabled' for the CORESET scheduling the PDSCH, the UE assumes that the TCI field is present in the DCI format 1_1 of the PDCCH transmitted on the CORESET. If a UE is configured with the higher layer parameter *tci-PresentDCI-1-2* for the CORESET scheduling the PDSCH, the UE assumes that the TCI field with a DCI field size indicated by *tci-PresentDCI-1-2* is present in the DCI format 1_2 of the PDCCH transmitted on the CORESET. If a UE is configured with the higher layer parameter *tci-PresentInDCI* that is set as 'enabled' for the CORESET scheduling the multicast PDSCH, the UE assumes that the TCI field is present in the DCI format 4_2 of the PDCCH transmitted on the CORESET. If the PDSCH is scheduled by a DCI format not having the TCI field present, and the time offset between the reception of the DL DCI and the corresponding PDSCH of a serving cell is equal to or greater than a threshold *timeDurationForQCL* if applicable, where the threshold is based on reported UE capability [13, TS 38.306], for determining PDSCH antenna port quasi co-location, the UE assumes that the TCI state or the QCL assumption for the PDSCH is identical to the TCI state or QCL assumption whichever is applied for the CORESET used for the PDCCH transmission within the active BWP of the serving cell.

<Unchanged text omitted>

FIG. 15

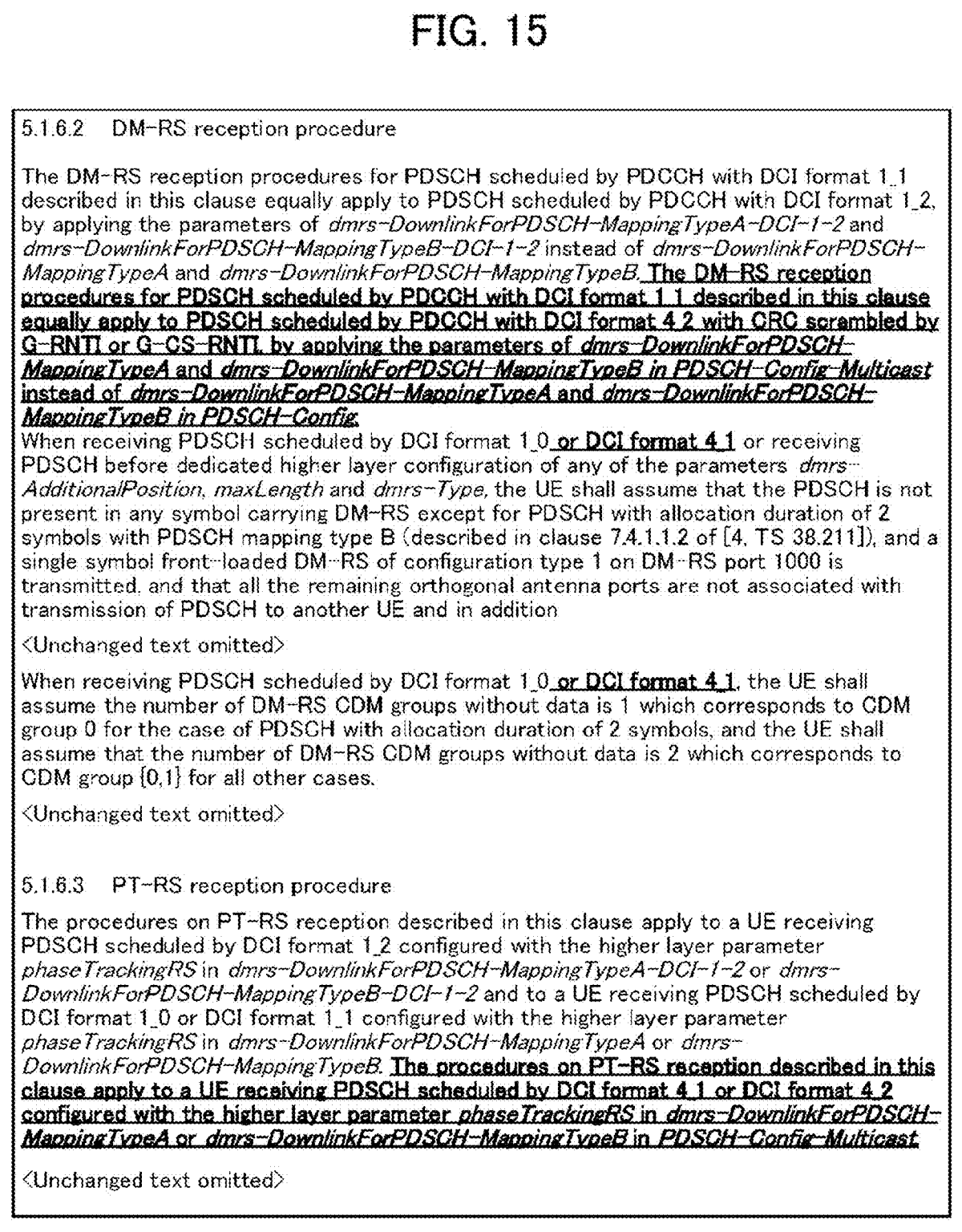

5.1.6.2 DM-RS reception procedure

The DM-RS reception procedures for PDSCH scheduled by PDCCH with DCI format 1_1 described in this clause equally apply to PDSCH scheduled by PDCCH with DCI format 1_2, by applying the parameters of *dmrs-DownlinkForPDSCH-MappingTypeA-DCI-1-2* and *dmrs-DownlinkForPDSCH-MappingTypeB-DCI-1-2* instead of *dmrs-DownlinkForPDSCH-MappingTypeA* and *dmrs-DownlinkForPDSCH-MappingTypeB*. **The DM-RS reception procedures for PDSCH scheduled by PDCCH with DCI format 1_1 described in this clause equally apply to PDSCH scheduled by PDCCH with DCI format 4_2 with CRC scrambled by G-RNTI or G-CS-RNTI, by applying the parameters of *dmrs-DownlinkForPDSCH-MappingTypeA* and *dmrs-DownlinkForPDSCH-MappingTypeB in PDSCH-Config-Multicast* instead of *dmrs-DownlinkForPDSCH-MappingTypeA* and *dmrs-DownlinkForPDSCH-MappingTypeB in PDSCH-Config*.**

When receiving PDSCH scheduled by DCI format 1_0 or DCI format 4_1 or receiving PDSCH before dedicated higher layer configuration of any of the parameters *dmrs-AdditionalPosition*, *maxLength* and *dmrs-Type*, the UE shall assume that the PDSCH is not present in any symbol carrying DM-RS except for PDSCH with allocation duration of 2 symbols with PDSCH mapping type B (described in clause 7.4.1.1.2 of [4, TS 38.211]), and a single symbol front-loaded DM-RS of configuration type 1 on DM-RS port 1000 is transmitted, and that all the remaining orthogonal antenna ports are not associated with transmission of PDSCH to another UE and in addition <Unchanged text omitted>

When receiving PDSCH scheduled by DCI format 1_0 or DCI format 4_1, the UE shall assume the number of DM-RS CDM groups without data is 1 which corresponds to CDM group 0 for the case of PDSCH with allocation duration of 2 symbols, and the UE shall assume that the number of DM-RS CDM groups without data is 2 which corresponds to CDM group {0,1} for all other cases.

<Unchanged text omitted>

5.1.6.3 PT-RS reception procedure

The procedures on PT-RS reception described in this clause apply to a UE receiving PDSCH scheduled by DCI format 1_2 configured with the higher layer parameter *phaseTrackingRS* in *dmrs-DownlinkForPDSCH-MappingTypeA-DCI-1-2* or *dmrs-DownlinkForPDSCH-MappingTypeB-DCI-1-2* and to a UE receiving PDSCH scheduled by DCI format 1_0 or DCI format 1_1 configured with the higher layer parameter *phaseTrackingRS* in *dmrs-DownlinkForPDSCH-MappingTypeA* or *dmrs-DownlinkForPDSCH-MappingTypeB*. **The procedures on PT-RS reception described in this clause apply to a UE receiving PDSCH scheduled by DCI format 4_1 or DCI format 4_2 configured with the higher layer parameter *phaseTrackingRS* in *dmrs-DownlinkForPDSCH-MappingTypeA* or *dmrs-DownlinkForPDSCH-MappingTypeB* in *PDSCH-Config-Multicast*.**

<Unchanged text omitted>

TERMINAL, BASE STATION, RADIO COMMUNICATION SYSTEM, AND RADIO COMMUNICATION METHOD

TECHNICAL FIELD

The present disclosure relates to a terminal compatible with multicast/broadcast service and a base station, a radio communication system, and a radio communication method.

BACKGROUND ART

The 3rd Generation Partnership Project (3GPP) specifies the 5th generation mobile communication system (also referred to as 5G, New Radio (NR), or Next Generation (NG)), and is also promoting next-generation specifications called Beyond 5G, 5G Evolution, or 6G.

3GPP Release 17 targets simultaneous data transmission (which may be referred to as distribution) service (MBS: Multicast and Broadcast Services) (tentative name) for multiple specified or unspecified terminals (User Equipments, UEs) in NR (Non Patent Literature 1).

CITATION LIST

Non-Patent Literature

[Non Patent Literature 1] "New Work Item on NR support of Multicast and Broadcast Services", RP-193248, 3GPP TSG RAN Meeting #86, 3GPP, December 2019

SUMMARY OF INVENTION

By the way, as Downlink Control Information (hereinafter referred to as DCI) to be used in the MBS, it is under consideration to define new DCI.

In such a background, as a result of diligent study, inventors have found it necessary to clarify, when the newly defined DCI is introduced for the MBS, processing related to the MBS based on the newly defined DCI.

Therefore, the present invention has been made to solve the above-described problems, and aims to provide a terminal, a base station, a radio communication system, and a radio communication method capable of appropriately performing processing related to MBS using DCI newly defined for the MBS.

An aspect of the disclosure is a terminal including: a receiving unit that receives data in data delivery to a plurality of terminals via a downlink channel; and a control unit that performs specific processing related to the data delivery based on downlink control information for multicast newly defined for the data delivery.

An aspect of the disclosure is a base station including: a transmitting unit that transmits data in data delivery to a plurality of terminals via a downlink channel; and a control unit that assumes that a terminal performs specific processing related to the data delivery based on downlink control information for multicast newly defined for the data delivery.

An aspect of the disclosure is a radio communication system including a terminal and a base station, wherein the terminal includes: a receiving unit that receives data in data delivery to a plurality of terminals via a downlink channel; and a control unit that performs specific processing related to the data delivery based on downlink control information for multicast newly defined for the data delivery.

An aspect of the disclosure is a radio communication method including: a step of receiving data in data delivery to a plurality of terminals via a downlink channel; and a step of performing specific processing related to the data delivery based on downlink control information for multicast newly defined for the data delivery.

BRIEF DESCRIPTION OF DRAWINGS

FIG. 6 is a diagram illustrating a configuration example of a PTM transmission scheme 1 and a PTM transmission scheme 2.

FIG. 7 is a diagram illustrating an operation example.

FIG. 8 is a diagram illustrating an operation example.

FIG. 9 is a diagram illustrating an operation example.

FIG. 10 is a diagram illustrating an operation example.

FIG. 11 is a diagram illustrating an operation example.

FIG. 12 is a diagram illustrating an operation example.

FIG. 13 is a diagram illustrating an operation example.

FIG. 14 is a diagram illustrating an operation example.

FIG. 15 is a diagram illustrating an operation example.

MODES FOR CARRYING OUT THE INVENTION

Hereinafter, an embodiment will be described based on the drawings. Note that, the same functions and configurations are denoted by the same or similar reference signs, and their description will be omitted as appropriate.

EMBODIMENT

(1) Overall Schematic Configuration of Radio Communication System

Figure 1:
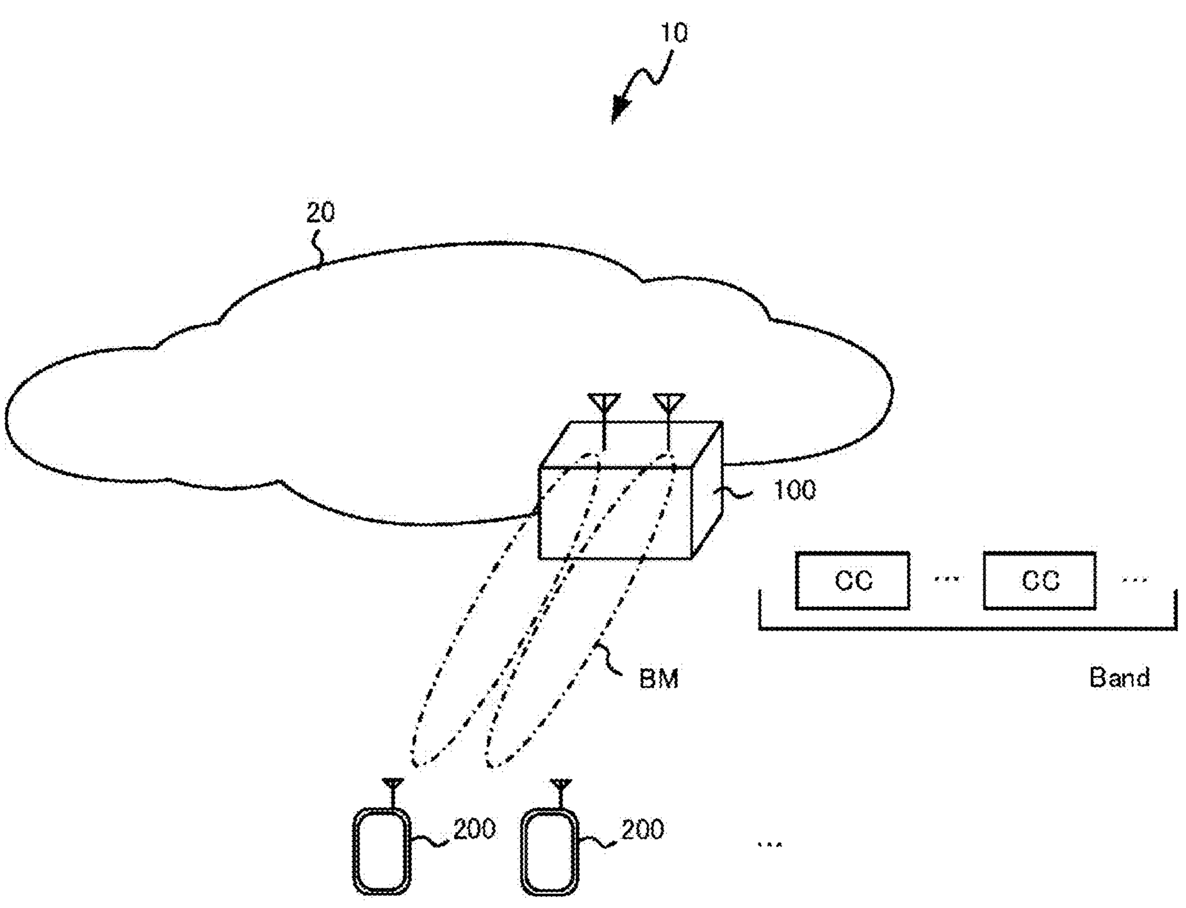
FIG. 1 is an overall schematic configuration diagram of a radio communication system 10.

FIG. 1 is an overall schematic configuration diagram of a radio communication system 10 according to the embodiment. The radio communication system 10 is a radio communication system according to 5G New Radio (NR), and includes a Next Generation-Radio Access Network 20 (hereinafter, NG-RAN 20) and a terminal 200 (hereinafter, UE (User Equipment) 200).

Note that, the radio communication system 10 may be a radio communication system according to a scheme called Beyond 5G, 5G Evolution, or 6G.

The NG-RAN 20 includes a base station 100 (hereinafter, qNB 100). Note that, the specific configuration of the radio communication system 10 including the number of gNBs 100 and UEs 200 is not limited to that of the example illustrated in FIG. 1.

The NG-RAN 20 actually includes multiple NG-RAN Nodes, specifically, gNBs (or ng-eNBs), and is connected to a core network (5GC, not illustrated) according to 5G. Note that, the NG-RAN 20 and 5GC may be simply expressed as a "network".

The gNB 100 is a radio base station according to 5G, and performs radio communication with the UE 200 according to 5G. The gNB 100 and the UE 200 can be compatible with Massive MIMO (Multiple-Input Multiple-Output) that generates a beam BM with higher directivity by controlling radio signals transmitted from multiple antenna elements, carrier aggregation (CA) that uses multiple component carriers (CCs) in a bundle, dual connectivity (DC) that communicates with two or more transport blocks at the same time between the UE and each of two NG-RAN Nodes, and the like.

Figure 2:
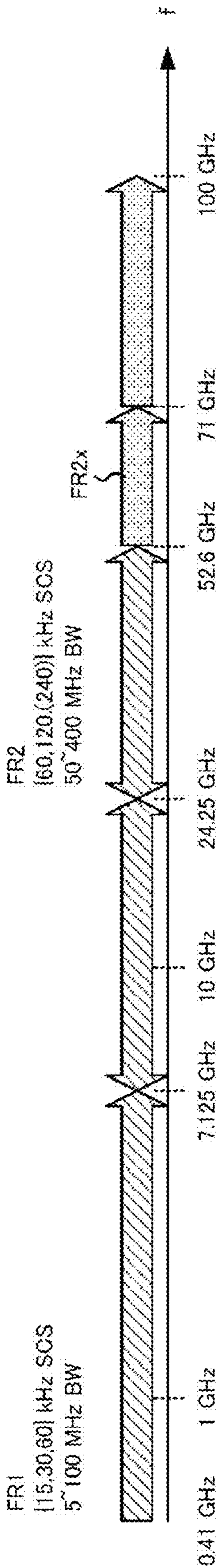
FIG. 2 is a diagram illustrating frequency ranges used in the radio communication system 10.

In addition, the radio communication system 10 is compatible with multiple frequency ranges (FRs). FIG. 2 is a diagram illustrating frequency ranges used in the radio communication system 10.

As illustrated in FIG. 2, the radio communication system 10 is compatible with an FR1 and an FR2. Frequency bands of the respective FRs are as follows.

FR1: 410 MHz to 7.125 GHZ

FR2: 24.25 GHz to 52.6 GHZ

In the FR1, a Sub-Carrier Spacing (SCS) of 15, 30, or 60 kHz may be used, and a bandwidth (BW) of 5 to 100 MHz may be used. The FR2 has a higher frequency than the FR1, and the SCS of 60 or 120 kHz (240 kHz may be included) may be used, and the bandwidth (BW) of 50 to 400 MHZ may be used.

Note that, the SCS may be interpreted as numerology. The numerology is defined in 3GPP TS38.300 and corresponds to one sub-carrier spacing in a frequency domain.

Further, the radio communication system 10 is also compatible with a higher frequency band than the FR2 frequency band. Specifically, the radio communication system 10 is compatible with a frequency band greater than 52.6 GHZ and up to 71 GHz or 114.25 GHZ. Such a high frequency band may be referred to as "FR2x" for convenience.

In order to solve the problem that the influence of phase noise becomes larger in the high frequency band, in the case of using a band exceeding 52.6 GHZ, Cyclic Prefix-Orthogonal Frequency Division Multiplexing (CP-OFDM)/Discrete Fourier Transform-Spread (DFT-S-OFDM) having larger Sub-Carrier Spacing (SCS) may be applied.

Figure 3:
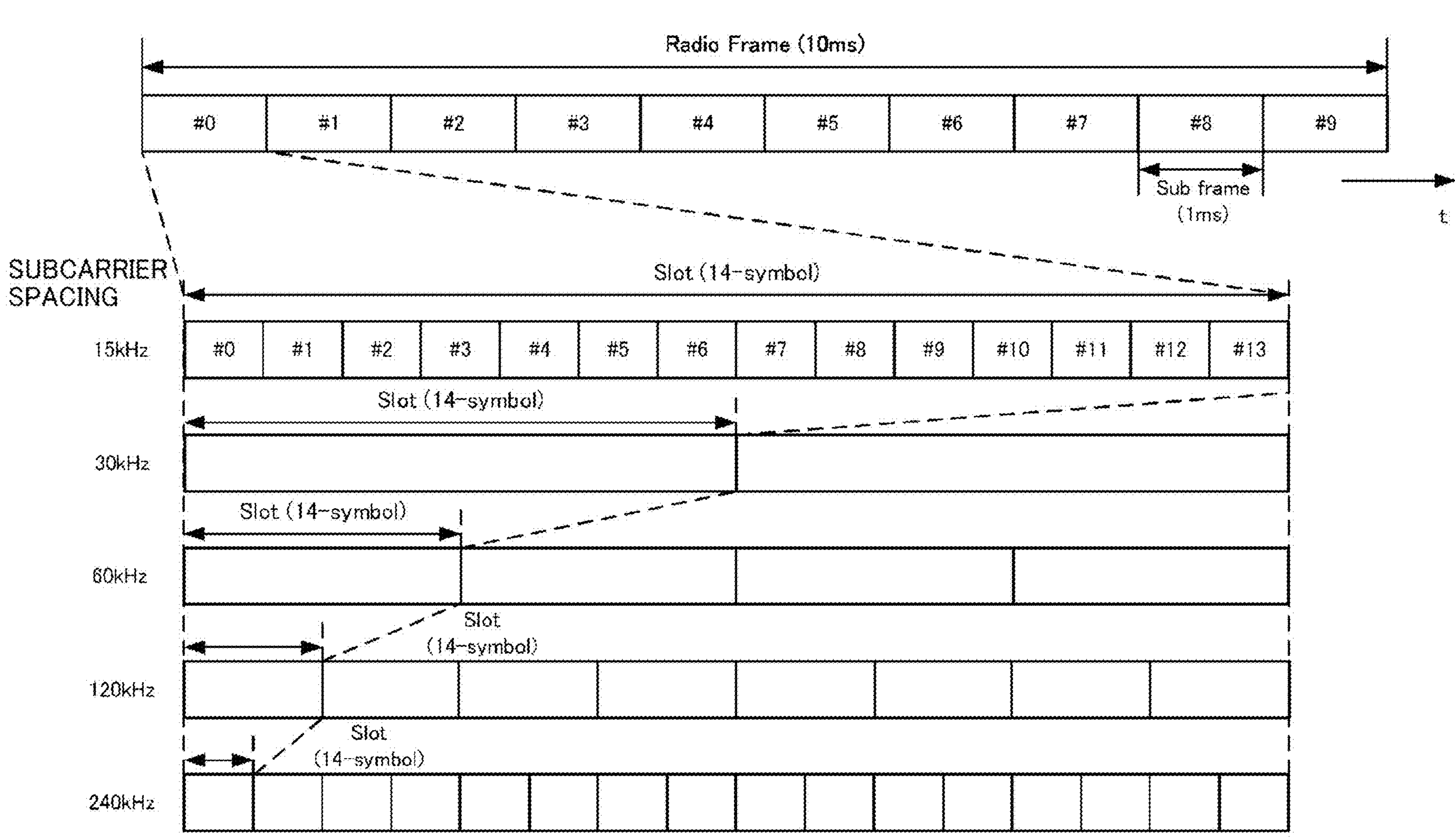
FIG. 3 is a diagram illustrating a configuration example of a radio frame, a subframe, and a slot used in the radio communication system 10.

FIG. 3 is a diagram illustrating a configuration example of a radio frame, a subframe, and a slot used in the radio communication system 10.

As illustrated in FIG. 3, one slot includes 14 symbols, and a symbol period (and a slot period) becomes shorter as the SCS becomes larger (wider). The SCS is not limited to the interval (frequency) illustrated in FIG. 3. For example, 480 kHz, 960 kHz, or the like may be used.

In addition, the number of symbols constituting one slot is not necessarily 14 symbols (for example, 28 symbols or 56 symbols). Further, the number of slots per subframe may be different depending on the SCS.

Note that, a time direction (t) illustrated in FIG. 3 may be referred to as a time domain, a symbol period, a symbol time, or the like. In addition, a frequency direction may be referred to as a frequency domain, a resource block, a subcarrier, a Bandwidth part (BWP), or the like.

A DMRS is a kind of reference signal, and is prepared for various channels. Here, unless otherwise specified, it may mean a downlink data channel, specifically, a DMRS for PDSCH (Physical Downlink Shared Channel). However, an uplink data channel, specifically, a DMRS for PUSCH (Physical Uplink Shared Channel) may be construed as being similar to a DMRS for PDSCH.

The DMRS may be used for channel estimation at the UE 200 as part of a device, e.g., coherent demodulation. The DMRS may exist only in resource blocks (RBs) used for PDSCH transmission.

The DMRS may have multiple mapping types. Specifically, the DMRS has a mapping type A and a mapping type B. In the mapping type A, the first DMRS is allocated in the second or third symbol of a slot. In the mapping type A, the DMRS may be mapped based on a boundary between slots regardless of where in a slot actual data transmission starts. The reason why the first DMRS is allocated in the second or third symbol of a slot may be construed as for the purpose of allocating the first DMRS after control resource sets (CORESET).

In the mapping type B, the first DMRS may be allocated in the first symbol of data assignment. In other words, the DMRS may be given relatively to a location where data is allocated, not to the boundary between slots.

Further, the DMRS may have multiple types (Types). Specifically, the DMRS has a Type 1 and a Type 2. The Type 1 and Type 2 are different in mapping and the maximum number of orthogonal reference signals in a frequency domain. The Type 1 can output up to four orthogonal signals in a single-symbol DMRS, and the Type 2 can output up to eight orthogonal signals in a double-symbol DMRS.

(2) Functional Block Configuration of Radio Communication System

Next, a functional block configuration of the radio communication system 10 will be described.

First, a functional block configuration of the UE 200 will be described.

Figure 4:
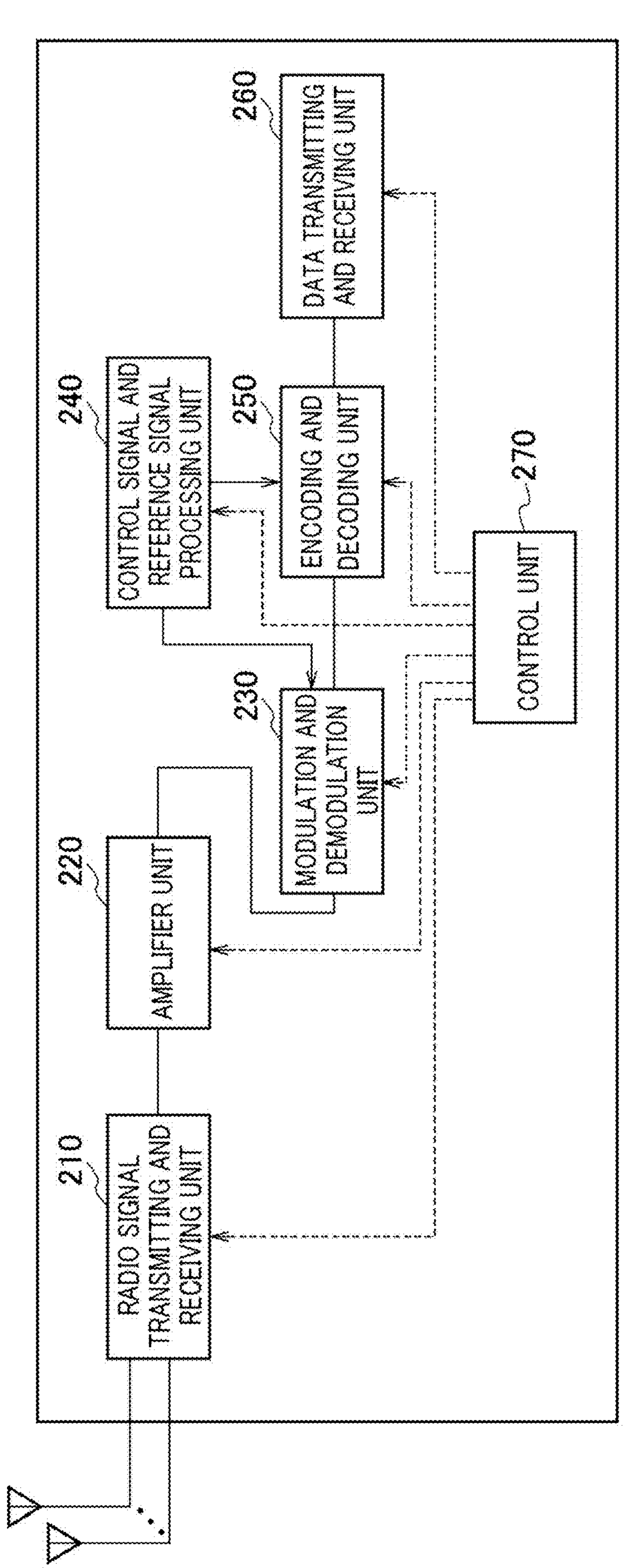
FIG. 4 is a functional block configuration diagram of a UE 200.

FIG. 4 is a functional block configuration diagram of the UE 200. As illustrated in FIG. 4, the UE 200 includes a radio signal transmitting and receiving unit 210, an amplifier unit 220, a modulation and demodulation unit 230, a control signal and reference signal processing unit 240, an encoding and decoding unit 250, a data transmitting and receiving unit 260, and a control unit 270.

The radio signal transmitting and receiving unit 210 transmits and receives a radio signal according to NR. The radio signal transmitting and receiving unit 210 deals with Massive MIMO, CA in which multiple CCs are bundled and used, DC in which communication is simultaneously performed between the UE and each of two NG-RAN Nodes, and the like.

The amplifier unit 220 includes a PA (Power Amplifier)/LNA (Low Noise Amplifier) and the like. The amplifier unit 220 amplifies a signal output from the modulation and demodulation unit 230 to a predetermined power level. In addition, the amplifier unit 220 amplifies an RF signal output from the radio signal transmitting and receiving unit 210.

The modulation and demodulation unit 230 executes data modulation and demodulation, transmission power setting, resource block assignment, and the like for each predetermined communication destination (gNB 100 or another gNB). In the modulation and demodulation unit 230, Cyclic Prefix-Orthogonal Frequency Division Multiplexing (CP-OFDM)/Discrete Fourier Transform-Spread (DFT-S-OFDM) may be applied. Further, DFT-S-OFDM may be used not only for uplink (UL) but also for downlink (DL).

The control signal and reference signal processing unit 240 executes processing related to various control signals transmitted and received by the UE 200, and processing related to various reference signals transmitted and received by the UE 200.

Specifically, the control signal and reference signal processing unit 240 receives various control signals transmitted from the gNB 100 via a predetermined control channel, for example, a control signal of a radio resource control layer (RRC). Further, the control signal and reference signal processing unit 240 transmits various control signals to the gNB 100 via a predetermined control channel.

The control signal and reference signal processing unit 240 executes processing using a reference signal (RS) such as a Demodulation Reference Signal (DMRS) and a Phase Tracking Reference Signal (PTRS).

The DMRS is a known terminal-specific reference signal (pilot signal) between the base station and the terminal for estimating a phasing channel used for data demodulation. The PTRS is a terminal-specific reference signal designed for the purpose of estimating phase noise that is a problem in a high frequency band.

Note that, the reference signal may include a Channel State Information-Reference Signal (CSI-RS), a Sounding Reference Signal (SRS), and a Positioning Reference Signal (PRS) for position information, in addition to the DMRS and the PTRS.

In addition, the channel includes a control channel and a data channel. The control channel includes a PDCCH (Physical Downlink Control Channel), a PUCCH (Physical Uplink Control Channel), a RACH (Random Access Channel), Downlink Control Information (DCI) including a Random Access Radio Network Temporary Identifier (RA-RNTI), a Physical Broadcast Channel (PBCH), and the like.

In addition, the data channel includes a PDSCH (Physical Downlink Shared Channel), a PUSCH (Physical Uplink Shared Channel), and the like. Data means data transmitted via the data channel. The data channel may be interchanged with a shared channel.

Here, the control signal and reference signal processing unit 240 may receive downlink control information (DCI). The DCI includes, as existing fields, fields for storing DCI Formats, Carrier (CI), indicator BWP indicator, FDRA (Frequency Domain Resource Assignment), TDRA (Time Domain Resource Assignment), MCS (Modulation and Coding Scheme), HPN (HARQ Process Number), NDI (New Data Indicator), RV (Redundancy Version), and the like.

A value stored in the DCI Format field is an information element specifying the format of the DCI. A value stored in the CI field is an information element specifying a CC for which the DCI is applied. A value stored in the BWP indicator field is an information element specifying a BWP for which the DCI is applied. The BWP that can be specified by the BWP indicator is configured by an information element (BandwidthPart-Config) included in an RRC message. A value stored in the FDRA field is an information element specifying a frequency domain resource for which the DCI is applied. The frequency domain resource is identified by a value stored in the FDRA field and an information element (RA Type) included in the RRC message. A value stored in the TDRA field is an information element specifying a time domain resource for which the DCI is applied. The time domain resource is identified by a value stored in the TDRA field and an information element (pdsch-TimeDomainAllocationList, pusch-TimeDomainAllocationList) included in the RRC message. The time domain resource may be identified by a value stored in the TDRA field and a default table. A value stored in the MCS field is an information element specifying an MCS for which the DCI is applied. The MCS is identified by a value stored in the MCS and an MCS table. The MCS table may be specified by the RRC message, or may be identified by RNTI scrambling. A value stored in the HPN field is an information element specifying a HARQ Process for which the DCI is applied. A value stored in the NDI is an information element for identifying whether data for which the DCI is applied is first transmission data. A value stored in the RV field is an information element specifying redundancy of data for which the DCI is applied.

The control signal and reference signal processing unit 240 constitutes a transmitting unit that transmits feedback on the data. As described below, the data may include data related to MBS (Multicast and Broadcast Services). As a method of transmitting the feedback (hereinafter HARQ feedback), a first method (hereinafter NACK-only feedback) in which a negative acknowledgement (NACK) is transmitted without transmitting an acknowledgement (ACK), and a second method (hereinafter ACK/NACK feedback) in which both the acknowledgement (ACK) and the negative acknowledgement (NACK) are transmitted, are supported.

The encoding and decoding unit 250 performs data division and coupling, channel coding and decoding, and the like for each predetermined communication destination (gNB 100 or another gNB).

Specifically, the encoding and decoding unit 250 divides data output from the data transmitting and receiving unit 260 into predetermined sizes, and performs channel coding on the divided data. Further, the encoding and decoding unit 250 decodes data output from the modulation and demodulation unit 230 and couples the decoded data.

The data transmitting and receiving unit 260 transmits and receives a Protocol Data Unit (PDU) and a Service Data Unit (SDU). Specifically, the data transmitting and receiving unit 260 performs assembly and disassembly of the PDU and SDU in multiple layers (a media access control layer (MAC), a radio link control layer (RLC), a packet data convergence protocol layer (PDCP), and the like). In addition, the data transmitting and receiving unit 260 executes error correction and retransmission control of data on the basis of HARQ (Hybrid Automatic Repeat Request).

In the embodiment, the data transmitting and receiving unit 260 constitutes a receiving unit that receives data via a downlink channel in data delivery for multiple terminals. Data delivery for multiple terminals may be referred to as MBS (Multicast and Broadcast Services). The downlink channel may include a PDSCH (broadcast) transmitted by broadcast, a PDSCH (multicast) transmitted by multicast, or a PDSCH (unicast) transmitted by unicast. The reception of the PDSCH (broadcast/multicast/unicast) may be read as the reception of data via the PDSCH (broadcast/multicast/unicast).

The control unit 270 controls each: functional block constituting the UE 200. In the embodiment, the control unit 270 performs specific processing related to the MBS based on downlink control information (hereinafter DCI) newly defined for the MBS. The DCI newly defined for the MBS may include DCI for broadcast and DCI for multicast.

A format of the DCI for broadcast may be called DCI format 4_0. The DCI format 4_0 may be considered to be a DCI format equivalent to the existing DCI format 1_0.

Specific processing related to broadcast may include one or more processing selected from among processing related to a resource allocation in a frequency domain, processing related to physical resource block bundling, and processing related to a demodulation reference signal.

A format of the DCI for multicast may be called DCI format 4_1 or DCI format 4_2. The DCI format 4_1 may be considered to be a DCI format equivalent to the existing DCI format 1_0. The DCI format 4_2 may be considered to be a DCI format equivalent to the existing DCI format 1_1.

Specific processing related to multicast may include one or more processing selected from among processing related to a resource allocation in a frequency domain, processing related to physical resource block bundling, processing related to a modulation coding scheme, processing related to downlink channel (hereinafter PDSCH) resource mapping, processing related to a transmission configuration indicator, processing related to a demodulation reference signal, and processing related to a phase tracking reference signal.

Secondly, a functional block configuration of the gNB 100 will be described.

Figure 5:
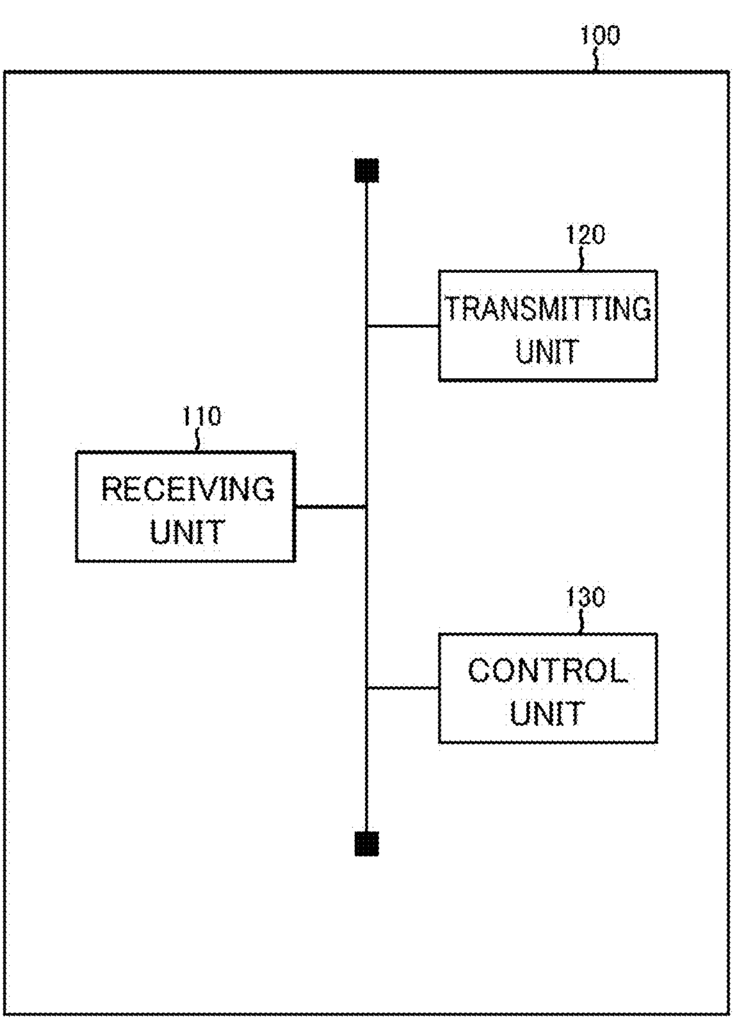
FIG. 5 is a functional block configuration diagram of a gNB 100.

FIG. 5 is a functional block configuration diagram of the gNB 100. As illustrated in FIG. 5, the gNB 100 includes a receiving unit 110, a transmitting unit 120, and a control unit 130.

The receiving unit 110 receives various signals from the UE 200. The receiving unit 110 may receive a UL signal via the PUCCH or the PUSCH.

The transmitting unit 120 transmits various signals to the UE 200. The transmitting unit 120 may transmit a DL signal via the PDCCH or the PDSCH. In the embodiment, the transmitting unit 120 may constitute a transmitting unit that transmits the PDSCH (broadcast/multicast/unicast) in the MBS. The transmission of the PDSCH (broadcast/multicast/unicast) may be read as the transmission of data via the PDSCH (broadcast/multicast/unicast).

The control unit 130 controls the gNB 100. In the embodiment, the control unit 130 may constitute a control unit that assumes that the UE 200 performs the specific processing related to the MBS based on the DCI newly defined for the MBS. The DCI newly defined for the MBS may include the DCI for broadcast and the DCI for multicast.

(3) Provision of MBS

In the radio communication system 10, Multicast/Broadcast services (MBS: Multicast and Broadcast Services) may be provided.

For example, in a stadium, a hall, or the like, it is assumed that a large number of UEs 200 are located in a certain geographical area, and the large number of UEs 200 simultaneously receive the same data. In such a case, use of the MBS instead of unicast is effective.

Note that, the unicast may be construed as communication performed on a one-to-one basis with a network by specifying one specific UE 200 (identification information unique to the UE 200 may be specified).

The multicast may be construed as communication performed on a one-to-multiple basis (a specific number) with a network by specifying multiple specific UEs 200 (identification information for multicast may be specified). Note that, the number of UEs 200 that receive reception multicast data may turn out to be one.

The broadcast may be construed as communication performed between a network and all the UEs 200 on a one-to-unspecified number basis. Data to be subjected to multicast/broadcast may have the same copied content, but may have partially different content such as a header. In addition, the data to be subjected to multicast/broadcast may be transmitted (delivered) simultaneously, but does not necessarily need to be transmitted exactly simultaneity, and may include a propagation delay and/or a processing delay in the RAN node.

Note that, a state of the radio resource control layer (RRC) of the target UE 200 may be any of an idle state (RRC idle), a connected state (RRC connected), and another state (for example, an inactive state). The inactive state may be construed as a state in which some settings of the RRC are maintained.

In the MBS, the following three types of methods are assumed for the scheduling of the multicast/broadcast PDSCH, specifically, the scheduling of an MBS packet (which may be read as data). Note that, an RRC connected UE may be read as an RRC idle UE or an RRC inactive UE.

- PTM transmission scheme 1 (PTM-1):
  - Scheduling group-common PDSCH to MBS group of RRC connected UE by using group-common PDCCH (Physical Downlink Control Channel)
  - CRC of PDCCH and PDSCH are scrambled by group-common RNTI (may be referred to as Radio Network Temporary Identifier, G-RNTI)
- PTM transmission scheme 2 (PTM-2):
  - Scheduling group-common PDSCH to MBS group of RRC connected UE by using terminal-specific (UE-specific) PDCCH
  - CRC of PDCCH is scrambled by UE-specific RNTI
  - PDSCH is scrambled by group-common RNTI
- PTP transmission scheme:
  - Scheduling UE-specific PDSCH to RRC connected UE by using UE-specific PDCCH
  - CRC of PDCCH and PDSCH are scrambled by UE-specific RNTI. That is, it may mean that the MBS packet is transmitted by unicast.

FIG. 6 is a diagram illustrating a configuration example of the PTM transmission scheme 1 and the PTM transmission scheme 2. Note that, the UE-specific PDCCH/PDSCH can be identified by the target UE, but does not need to be able to be identified by other UEs in the same MBS group. The group-common PDCCH/PDSCH is transmitted on the same time/frequency resource, and can be identified by all the UEs in the same MBS group. In addition, the names of the PTM transmission schemes 1 and 2 are tentative names, and may be called other names as long as the above-described operation is executed in these schemes.

Note that, in point-to-point (PTP) delivery, the RAN node may deliver individual copies of MBS data packets to the respective UEs wirelessly. In point-to-multipoint (PTM) delivery, the RAN node may deliver a single copy of the MBS data packets to a set of the UEs wirelessly.

In addition, in order to improve reliability of the MBS, the following two feedback methods are assumed for feedback of HARQ (Hybrid Automatic repeat request), specifically, HARQ feedback for multicast/broadcast PDSCH.

- Option 1: Feedback both ACK/NACK (ACK/NACK feedback)
  - UE that has successfully received and decoded PDSCH, transmits ACK
  - UE that has failed in receiving and decoding PDSCH, transmits NACK
  - PUCCH (Physical Uplink Control Channel) resource setting: PUCCH-Config can be configured for multicast
  - PUCCH resource: Shared/orthogonal between UEs depends on setting of network
  - HARQ-ACK CB (codebook): Support for type-1 and type-2 (CB determination algorithm (defined in 3GPP TS38.213))

Multiplexing: Unicast or multicast may be applied

Option 2: Feedback only NACK (NACK-only feedback)

UE that has successfully received and decoded PDSCH, does not transmit ACK (does not transmit a response)

UE that has failed in receiving and decoding PDSCH, transmits NACK

In certain UEs, resource setting of PUCCH can be configured separately depending on unicast or groupcast (multicast)

Note that, the ACK may be referred to as positive acknowledgement, and the NACK may be referred to as negative acknowledgement. The HARQ may be referred to as an automatic repeat request.

Either of the following may be applied to enable and disable (enable/disable) Option 1 or Option 2.

RRC and downlink control information (DCI)

Only RRC

Further, the following contents are assumed for SPS (Semi-persistent Scheduling) of the multicast/broadcast PDSCH.

Employ SPS group-common PDSCH

Multiple SPS group-common PDSCH can be configured as UE capability

HARQ feedback for SPS group-common PDSCH is possible

Activation/deactivation by at least group-common PDCCH (downlink control channel) is possible Note that, deactivation may be read as another synonymous term such as release. For example, activation may be read as activation, start, trigger, and the like, and deactivation may be further read as termination, stop, and the like.

The SPS is scheduling used as a contrast with dynamic scheduling, may be referred to as semi-fixed, semi-persistent, or semi-permanent scheduling, or may be construed as Configured Scheduling (CS).

The scheduling may be construed as a process of assigning a resource for transmitting data. The dynamic scheduling may be construed as a mechanism in which all PDSCH are scheduled by DCI. The SPS may be construed as a mechanism in which PDSCH transmission is scheduled by higher layer signaling such as the RRC message.

In addition, regarding a physical layer, there may be scheduling categories of time domain scheduling and frequency domain scheduling.

In addition, multicast, groupcast, broadcast, and MBS may be interchanged with each other. The PDSCH (broadcast/multicast) may be interchanged with PDSCH scrambled by the group common RNTI.

In addition, terms of data and packets may be interchanged with each other and may be construed as synonymous with terms of signals, data units, and the like. Further, transmission, reception, transfer, and delivery may be interchanged with each other.

(4) Problem

As a result of diligent study, the inventors have found it necessary to clarify the processing related to the MBS based on the newly defined DCI, assuming the case where the newly defined DCI (DCI format 4_0, DCI format 4_1, and/or DCI format 4_2 described above) will be introduced for MBS.

(5) Operation Example

Clarification of the processing related to the MBS based on the newly defined DCI will be described blow.

(5.1) DCI for Broadcast

The DCI for broadcast (DCI format 4_0) newly defined for the MBS will be described. The specific processing based on the DCI format 4_0 may include the following processing.

Firstly, the specific processing may include the processing related to the resource allocation in the frequency domain. Specifically, the UE 200 may assume that when a scheduling grant is received with the DCI format 4_0, a specific downlink resource allocation type (e.g., downlink resource allocation type 1) is used. The downlink resource allocation type 1 may be a type to be assumed when the scheduling grant is received with DCI format 1_0. For example, 3GPP TS38.214 V17.0.0 section 5.1.2.2 may be described as shown in FIG. 7.

Secondly, the specific processing may include the processing related to the physical resource block (hereinafter PRB) bundling. Specifically, if the UE 200 is scheduled a PDSCH with the DCI format 4_0, the UE 200 may assume that precoding granularity ($P'_{BWP,i}$) is equal to a specific number (e.g., 2 PRBs). 2 PRBs may be precoding granularity ($P'_{BWP,i}$) to be assumed when a PDSCH is scheduled with the DCI format 1_0. The $P'_{BWP,i}$ may be consecutive resource blocks in the frequency domain. For example, 3GPP TS38.214 V17.0.0 section 5.1.2.3 may be described as shown in FIG. 8.

Thirdly, the specific processing may the processing related to the demodulation reference signal (hereinafter DM-RS). Specifically, the UE 200 may assume that in a case where a PDSCH is scheduled with the DCI format 4_0, the same procedure as in a case where a PDSCH is scheduled with the DCI format 1_0 is applied to DM-RS reception procedure. For example, 3GPP TS38.214 V17.0.0 section 5.1.6.2 may be described as shown in FIG. 9.

(5.2) DCI for Multicast

The DCI for multicast (DCI format 4_1 and/or DCI format 4_2) newly defined for the MBS will be described. The specific processing based on the DCI format 4_1 and/or the DCI format 4_2 may include the following processing.

Firstly, the specific processing may include the processing related to the resource allocation in the frequency domain. Specifically, the UE 200 may assume that when a scheduling grant is received with the DCI format 4_1, a specific downlink resource allocation type (e.g., downlink resource allocation type 1) is used. The downlink resource allocation type 1 may be a type to be assumed when the scheduling grant is received with DCI format 1_0. On the other hand, if a higher layer parameter (e.g., resourceAllocation in PDSCH-Config-Multicast) is set to "dynamic switch" for the DCI format 4_2, the UE 200 may use downlink resource allocation type (0 or 1) as defined by a field included in the DCI format 4_2. For example, 3GPP TS38.214 V17.0.0 section 5.1.2.2 may be described as shown in FIG. 10.

Secondly, the specific processing may include the processing related to the physical resource block (PRB) bundling. Specifically, if the UE 200 is scheduled a PDSCH with the DCI format 4_1, the UE 200 may assume that precoding granularity ($P'_{BWP,i}$) is equal to a specific number (e.g., 2 PRBs). 2 PRBs may be precoding granularity ($P'_{BWP,i}$) to be assumed when a PDSCH is scheduled with the DCI format 1_0. On the other hand, when a PDSCH is scheduled with the DCI format 4_2, the UE 200 may assume that precoding granularity ($P'_{BWP,i}$) for CFR (Common Frequency Resource) is equal to a specific number (e.g., 2 PRBs (Physical Resource Blocks)) unless a higher layer parameter (e.g., prb-BundlingType in PDSCH-Config-Multicast) is configured. When a PDSCH is scheduled with the DCI format 4_2, the UE 200 may assume precoding granularity ($P'_{BWP,i}$) configured by a higher layer parameter (e.g., bundleSizeSet1 or bundleSizeSet2) if a higher layer parameter (e.g., prb-BundlingType in PDSCH-Config-Multicast) is set to "dynamicBundling". For example, 3GPP TS38.214 V17.0.0 section 5.1.2.3 may be described as shown in FIG. 11.

Thirdly, the specific processing may include the processing related to the modulation coding scheme (hereinafter MCS). Specifically, if a PDSCH is scheduled by a PDCCH with the DCI format 4_1 or the DCI format 4_2 and a higher layer parameter (e.g., mcs-Table in PDSCH-Config-Multicast) is set to qam64LowSE, the UE 200 uses an MCS Index ($I_{MCS}$) and a specific table (e.g., Table 5.1.3.1-3) to determine Modulation Order ($Q_m$) and Target code Rate (R). Table 5.1.3.1-3 may be one example of an MCS table used in 64 QAM Low SE Spectral Efficiency. For example, 3GPP TS38.214 V17.0.0 section 5.1.3.1 may be described as shown in FIG. 12.

Fourthly, the specific processing may include the processing related to the PDSCH resource mapping. Specifically, in a case where a PDSCH is scheduled by a PDCCH with the DCI format 4_2, the UE 200 may use the same procedure as in a case where a PDSCH is scheduled by a PDCCH with the DCI format 1_1 to perform PDSCH resource mapping with RB (Resource Block) symbol level granularity. In a case where a PDSCH is scheduled by a PDCCH with the DCI format 4_2, the UE 200 may use the same procedure as in a case where a PDSCH is scheduled by a PDCCH with the DCI format 1_1 to perform PDSCH resource mapping with RE (Resource Element) level granularity. For example, 3GPP TS38.214 V17.0.0 section 5.1.4 may be described as shown in FIG. 13.

Fifthly, the specific processing may include the processing related to the transmission configuration indicator (hereinafter TCI). Specifically, in a case where a higher layer parameter (tci-PresentInDCI) is set as "enabled" for CORESET scheduling a multicast PDSCH, the UE 200 assumes that a TCI field is present in the DCI format 4_2 of a PDCCH transmitted on the CORESET. The higher layer parameter (tci-PresentInDCI) may be configured by an RRC parameter for multicast PDSCH (e.g., PDSCH-Config-Multicast). For example, 3GPP TS38.214 V17.0.0 section 5.1.5 may be described as shown in FIG. 14.

Sixthly, the specific processing may include the processing related to the demodulation reference signal (DM-RS), and/or the processing related to the phase tracking reference signal (hereinafter PT (Phase Tracking)-RS). Specifically, in a case where a PDSCH is scheduled with the DCI format 4_1, the UE 200 may assume a DM-RS reception process using the same procedure as in a case where a PDSCH is scheduled with the DCI format 1_0. In a case where a PDSCH is scheduled with the DCI format 4_2, the UE 200 may assume a DM-RS reception process using the same procedure as in a case where a PDSCH is scheduled with the DCI format 1_1. Also, in a case where a PDSCH is scheduled with the DCI format 4_1, the UE 200 may assume a PT-RS reception process using the same procedure as in a case where a PDSCH is scheduled with the DCI format 1_0. Inn a case where a PDSCH is scheduled with the DCI format 4_2, the UE 200 may assume a PT-RS reception process using the same procedure as in a case where a PDSCH is scheduled with the DCI format 1_1. For example, 3GPP TS38.214 V17.0.0 section 5.1.6.2 and section 5.1.6.3 may be described as shown in FIG. 15.

(6) Action and Effect

In the embodiment, the UE 200 performs the specific processing related to the MBS based on the DCI (e.g., DCI format 4_0, DCI format 4_1, and/or DCI format 4_2) newly defined for the MBS. According to this configuration, the processing based on the DCI newly defined for the MBS is clarified. Thus, it is possible to appropriately perform the specific processing related to the MBS based on the newly defined DCI.

(7) Other Embodiments

Although the contents of the present invention have been described above with reference to the embodiment, the present invention is not limited to these, and it is obvious to those skilled in the art that various modifications and improvements can be made.

Although not specifically described in the above disclosure, a higher layer parameter referenced in the DCI for broadcast (DCI format 4_0) may be a higher layer parameter for the MBS. The higher layer parameter for the MBS may be referred to as PDSCH-Config-broadcast. Similarly, the higher layer parameter referenced in the DCI for multicast (DCI format 4_1, DCI format 4_2) may be a higher layer parameter for the MBS. The higher layer parameter for the MBS may be referred to as PDSCH-Config-multicast.

Although not specifically described in the above disclosure, in MBS, the PDSCH (unicast) and the PDSCH (multicast) may be time-division multiplexed. The PDSCH (unicast) may be referred to as TDMed PDSCH (unicast). The PDSCH (multicast) may be referred to as TDMed PDSCH (multicast). In MBS, frequency division multiplexing of the TDMed PDSCH (unicast) and the DMed PDSCH (multicast) may be supported, and frequency division multiplexing of the TDMed PDSCH (multicast) may be supported.

The block configuration diagram (FIG. 4 and FIG. 5) used in the description of the above-described embodiments illustrates blocks of functional units. Those functional blocks (structural components) can be realized by a desired combination of at least one of hardware and software. A means for realizing each functional block is not particularly limited. That is, each functional block may be realized by one device combined physically or logically. Alternatively, two or more devices separated physically or logically may be directly or indirectly connected (for example, using wired, wireless, or the like) to each other, and each functional block may be realized by these plural devices. The functional blocks may be realized by combining software with the one device or the plural devices described above.

Functions include judging, deciding, determining, calculating, computing, processing, deriving, investigating, searching, confirming, receiving, transmitting, outputting, accessing, resolving, selecting, choosing, establishing, comparing, assuming, expecting, considering, broadcasting, notifying, communicating, forwarding, configuring, reconfiguring, allocating (mapping), assigning, and the like. However, the functions are not limited thereto. For example, a functional block (structural component) that functions to transmit is called a transmitting unit or a transmitter. As described above, the means for realizing is not particularly limited.

Figure 16:
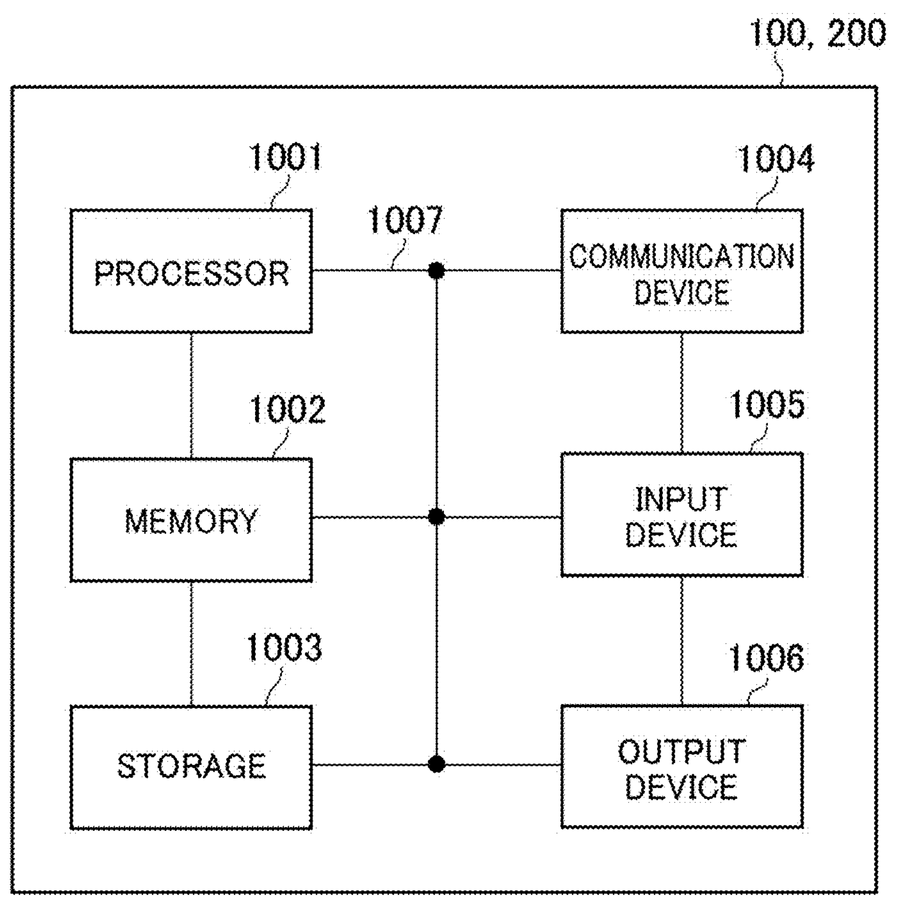
FIG. 16 is a diagram illustrating an example of a hardware configuration of the gNB 100 and the UE 200.

Furthermore, the gNB 100 and the UE 200 (apparatus) described above may function as computers for processing the radio communication method of the present disclosure. FIG. 16 is a diagram illustrating an example of a hardware configuration of the apparatus. As illustrated in FIG. 16, the apparatus may be configured as a computer device including a processor 1001, a memory 1002, a storage 1003, a communication device 1004, an input device 1005, an output device 1006, a bus 1007, and the like.

Note that, in the following description, the term "device" can be replaced with a circuit, a device, a unit, or the like. A hardware configuration of the apparatus can be constituted by including one or more of each of devices illustrated in the diagram, or can be constituted by without including a part of the devices.

Each functional block of the apparatus (see FIG. 4) is implemented by any of hardware elements of the computer device or a combination of the hardware elements.

Moreover, the processor 1001 performs computing by loading a predetermined software (computer program) on hardware such as the processor 1001 and the memory 1002, and realizes each function in the apparatus by controlling communication via the communication device 1004, and controlling at least one of reading and writing of data on the memory 1002 and the storage 1003.

The processor 1001, for example, operates an operating system to control the entire computer. The processor 1001 may be configured with a central processing unit (CPU), including an interface to a peripheral device, a controller, an arithmetic device, a register, and the like.

Moreover, the processor 1001 reads a computer program (program code), a software module, data, and the like from at least one of the storage 1003 and the communication device 1004 into the memory 1002, and executes various processes according to them. As the computer program, a computer program that causes the computer to execute at least a part of the operation in the above-described embodiments, is used. Alternatively, various processes described above may be one executed by processor 1001 or may be executed simultaneously or sequentially by two or more processors 1001. The processor 1001 may be implemented by using one or more chips. Note that the computer program may be transmitted from a network via a telecommunication line.

The memory 1002 is a computer readable recording medium and is configured, for example, with at least one of Read Only Memory (ROM), Erasable Programmable ROM (EPROM), Electrically Erasable Programmable ROM (EEPROM), Random Access Memory (RAM), and the like. The memory 1002 may be referred to as a register, a cache, a main memory (main storage device), or the like. The memory 1002 can store a program (program code), a software module, or the like capable of executing a method according to the embodiment of the present disclosure.

The storage 1003 is a computer readable recording medium. For example, the storage 1003 may include at least one of an optical disk such as Compact Disc ROM (CD-ROM), a hard disk drive, a flexible disk, a magneto-optical disk (for example, a compact disk, a digital versatile disk, Blu-ray (Registered Trademark) disk), a smart card, a flash memory (for example, a card, a stick, a key drive), a floppy (Registered Trademark) disk, a magnetic strip, and the like. The storage 1003 may be called an auxiliary storage device. The recording medium described above may be, for example, a database including at least one of the memory 1002 and the storage 1003, a server, or other appropriate medium.

The communication device 1004 is hardware (transmission and reception device) capable of performing communication between computers via at least one of a wired network and a wireless network. The communication device 1004 is also called, for example, a network device, a network controller, a network card, a communication module, or the like.

The communication device 1004 includes a high-frequency switch, a duplexer, a filter, a frequency synthesizer, and the like in order to realize, for example, at least one of Frequency Division Duplex (FDD) and Time Division Duplex (TDD).

The input device 1005 is an input device (for example, a keyboard, a mouse, a microphone, a switch, a button, a sensor, and the like) that accepts input from the outside. The output device 1006 is an output device (for example, a display, a speaker, an LED lamp, and the like) that outputs data to the outside. Note that, the input device 1005 and the output device 1006 may be integrated (for example, a touch screen).

Each of devices such as the processor 1001 and the memory 1002, is connected by a bus 1007 for communicating information. The bus 1007 may be configured using a single bus or a different bus for each device.

Further, the apparatus may be configured to include hardware such as a microprocessor, a digital signal processor (Digital Signal Processor: DSP), Application Specific Integrated Circuit (ASIC), Programmable Logic Device (PLD), Field Programmable Gate Array (FPGA), and the like. Some or all of the functional blocks may be realized by the hardware. For example, the processor 1001 may be implemented by using at least one of these hardware.

The notification of information is not limited to the aspects/embodiments described in the present disclosure, and may be performed using other methods. For example, the notification of information may be performed by physical layer signaling (e.g., Downlink Control Information (DCI), Uplink Control Information (UCI), higher layer signaling (e.g., RRC signaling, Medium Access Control (MAC) signaling, Broadcast Information (Master Information Block (MIB), System Information Block (SIB)), other signals, or combinations thereof. The RRC signaling may also be referred to as an RRC message, e.g., an RRC Connection Setup message, an RRC Connection Reconfiguration message, or the like.

Each of the above aspects/embodiments described in the present disclosure may be applied to at least one of Long Term Evolution (LTE), LTE-Advanced (LTE-A), SUPER 3G, IMT-Advanced, 4th generation mobile communication system (4G), 5th generation mobile communication system (5G), Future Radio Access (FRA), New Radio (NR), W-CDMA (Registered Trademark), GSM (Registered Trademark), CDMA2000, Ultra Mobile Broadband (UMB), IEEE 802.11 (Wi-Fi (Registered Trademark)), IEEE 802.16 (WiMAX (Registered Trademark)), IEEE 802.20, Ultra-WideBand (UWB), Bluetooth (Registered Trademark), a system using any other appropriate system, and a next-generation system that is expanded based on these. Further, a plurality of systems may be combined (for example, a combination of at least one of the LTE and the LTE-A with the 5G).

The processing procedures, sequences, flowcharts, and the like of each of the above aspects/embodiments described in the present disclosure may be rearranged as long as there is no conflict. For example, the method described in the present disclosure presents the elements of the various steps using an exemplary sequence, and is not limited to the particular sequence presented.

The specific operation that is performed by the base station in the present disclosure may be performed by its upper node in some cases. In a network constituted by one or more network nodes having the base station, the various operations performed for communication with the terminal may be performed by at least one of the base station and other network nodes other than the base station (for example, MME, S-GW, or the like may be considered, but not limited thereto). Although, in the above, an example in which one other network node other than the base station is used has been described, a combination of a plurality of other network nodes (for example, MME and S-GW) may be used.

Information, and signals (information and the like) can be output from a higher layer (or lower layer) to a lower layer (or higher layer). It may be input and output via a plurality of network nodes.

The input/output information may be stored in a specific location (for example, a memory) or may be managed in a management table. The information to be input/output can be overwritten, updated, or added. The information having been output can be deleted. The information having been input can be transmitted to another device.

The determination may be made by a value (0 or 1) represented by one bit or by Boolean value (Boolean: true or false), or by comparison of numerical values (for example, comparison with a predetermined value).

Each of the above aspects/embodiments described in the present disclosure may be used alone or in combination, or may be switched as it is executed. Further, notification of predetermined information (for example, notification of "being X") is not limited to being performed explicitly, but it may be performed implicitly (for example, without notifying the predetermined information).

Instead of being referred to as software, firmware, middleware, microcode, hardware description language, or some other name, software should be interpreted broadly to mean instruction, instruction set, code, code segment, program code, program, subprogram, software module, application, software application, software package, routine, subroutine, object, executable file, execution thread, procedure, function, and the like.

Further, software, instruction, information, and the like may be transmitted and received via a transmission medium. For example, when a software is transmitted from a website, a server, or some other remote source by using at least one of a wired technology (coaxial cable, fiber optic cable, twisted pair, Digital Subscriber Line (DSL), or the like) and a wireless technology (infrared light, microwave, or the like), then at least one of these wired and wireless technologies is included within the definition of the transmission medium.

Information, signals, or the like described above may be represented by using any of a variety of different technologies. For example, data, instruction, command, information, signal, bit, symbol, chip, or the like that may be described throughout the above description, may be represented by voltage, current, electromagnetic wave, magnetic field or magnetic particle, optical field or photons, or a desired combination thereof.

Note that the terms described in this disclosure and the terms necessary for understanding the present disclosure may be replaced by terms having the same or similar meanings. For example, at least one of the channel and the symbol may be a signal (signaling). Also, the signal may be a message. Further, Component Carrier (CC) may be referred to as a carrier frequency, a cell, a frequency carrier, or the like.

The terms "system" and "network" used in the present disclosure can be used interchangeably.

Further, the information, the parameters, and the like described in the present disclosure can be represented by an absolute value, can be expressed as a relative value from a predetermined value, or can be represented by corresponding other information. For example, the radio resource can be indicated by an index.

The names used for the above-described parameters are not restrictive names in any respect. In addition, formulas and the like using these parameters may be different from those explicitly disclosed in the present disclosure. Because the various channels (for example, PUCCH, PDCCH, or the like) and information elements can be identified by any suitable names, the various names assigned to these various channels and information elements shall not be restricted in any way.

In the present disclosure, the terms "base station (Base Station: BS)", "radio base station", "fixed station", "NodeB", "eNodeB (eNB)", "gNodeB (gNB)", "access point", "transmission point", "reception point", "transmission/reception point", "cell", "sector", "cell group", "carrier", "component carrier", and the like can be used interchangeably. The base station may also be referred to with the term such as a macro cell, a small cell, a femtocell, or a pico cell.

The base station can accommodate one or more (for example, three) cells (also called sectors). In a configuration in which the base station accommodates a plurality of cells, the entire coverage area of the base station can be divided into a plurality of smaller areas. In each such a smaller area, communication service can be provided by a base station subsystem (for example, a small base station for indoor use (Remote Radio Head: RRH)).

The term "cell" or "sector" refers to a part or all of the coverage area of at least one of a base station and a base station subsystem that perform communication service in this coverage.

In the present disclosure, the terms "mobile station (Mobile Station: MS)," "user terminal," "user equipment (User Equipment: UE)," "terminal" and the like can be used interchangeably.

The mobile station is called by the persons skilled in the art as a subscriber station, a mobile unit, a subscriber unit, a wireless unit, a remote unit, a mobile device, a wireless device, a wireless communication device, a remote device, a mobile subscriber station, an access terminal, a mobile terminal, a wireless terminal, a remote terminal, a handset, a user agent, a mobile client, or a client, or with some other suitable term.

At least one of the base station and the mobile station may be called a transmitting device, a receiving device, a communication device, or the like. Note that, at least one of the base station and the mobile station may be a device mounted on a moving body, a moving body itself, or the like. The mobile body may be a vehicle (for example, car, plane, etc.), an unmanned mobile body (for example, drone, self-driving car,), or a robot (manned or unmanned). At least one of the base station and the mobile station can be a device that does not necessarily move during the communication operation. For example, at least one of the base station and the mobile station may be an Internet of Things (IoT) device such as a sensor.

The base station in the present disclosure may be read as a mobile station (user terminal, the same applies hereinafter). For example, each aspect/embodiment of the present disclosure may be applied to a configuration in which communication between the base station and the mobile station is replaced by communication between a plurality of mobile stations (for example, it may be called device-to-device (D2D), vehicle-to-everything (V2X), etc.). In this case, the mobile station may have the function of the base station. Further, words such as "up" and "down" may be replaced with words corresponding to communication between terminals (for example, "side"). For example, up channels, down channels, etc. may be replaced with side channels (or side links).

Similarly, the mobile station in the present disclosure may be read as a base station. In this case, the base station may have the function of the mobile station.

A radio frame may be composed of one or more frames in the time domain. Each of one or more frames in the time domain may be referred to as a subframe.

The subframe may be further configured by one or more slots in the time domain. The subframes may be a fixed time length (for example, 1 ms) independent of numerology.

Numerology may be a communication parameter applied to at least one of transmission and reception of a certain signal or channel. The numerology may represent one among, for example, subcarrier spacing (SubCarrier Spacing: SCS), bandwidth, symbol length, cyclic prefix length, transmission time interval (Transmission Time Interval: TTI), number of symbols per TTI, radio frame configuration, specific filtering process performed by a transceiver in the frequency domain, specific windowing process performed by a transceiver in the time domain, and the like.

A slot may be configured with one or a plurality of symbols (Orthogonal Frequency Division Multiplexing (OFDM) symbols, Single Carrier Frequency Division Multiple Access (SC-FDMA) symbols, etc.) in the time domain. The slot may be a unit of time based on the numerology.

The slot may include a plurality of minislots. Each minislot may be configured with one or more symbols in the time domain. The minislot may also be called a subslot. The minislot may be composed of symbols fewer than symbols in one slot. PDSCH (or PUSCH) transmitted in units of time greater than the minislot may be referred to as PDSCH (or PUSCH) mapping type A. PDSCH (or PUSCH) transmitted using a minislot may be referred to as PDSCH (or PUSCH) mapping type B.

Each of the radio frame, subframe, slot, minislot, and symbol represents a time unit for transmitting a signal. Different names may be used for the radio frame, subframe, slot, minislot, and symbol.

For example, one subframe may be called a transmission time interval (TTI), a plurality of consecutive subframes may be called TTI, and one slot or one minislot may be called TTI. That is, at least one of the subframe and the TTI may be a subframe (1 ms) in the existing LTE, a period shorter than 1 ms (for example, 1-13 symbols), or a period longer than 1 ms. Note that, a unit representing TTI may be called a slot, a minislot, or the like instead of a subframe.

Here, TTI refers to a minimum time unit of scheduling in radio communication, for example. For example, in the LTE system, the base station performs scheduling for allocating radio resources (frequency bandwidth, transmission power, etc. that can be used in each user terminal) to each user terminal in units of TTI. The definition of TTI is not limited to this.

TTI may be a transmission time unit such as a channel-encoded data packet (transport block), a code block, or a code word, or may be a processing unit such as scheduling or link adaptation. Note that when TTI is given, a time interval (for example, the number of symbols) in which a transport block, a code block, a code word, or the like are actually mapped may be shorter than TTI.

When one slot or one minislot is called TTI, one or more TTIs (that is, one or more slots or one or more minislots) may be a minimum time unit of scheduling. The number of slots (number of minislots) constituting the minimum time unit of scheduling may be controlled.

TTI having a time length of 1 ms may be referred to as an ordinary TTI (TTI in LTE Rel. 8-12), a normal TTI, a long TTI, a normal subframe, a normal subframe, a long subframe, a slot, or the like. TTI shorter than the ordinary TTI may be referred to as a shortened TTI, a short TTI, a partial TTI (partial or fractional TTI), a shortened subframe, a short subframe, a minislot, a subslot, a slot, or the like.

Note that a long TTI (for example, ordinary TTI, subframe, etc.) may be read as TTI having a time length exceeding 1 ms, and a short TTI (for example, shortened TTI) may be read as TTI having TTI length of less than the TTI length of the long TTI but TTI length of 1 ms or more.

A resource block (RB) is a resource allocation unit in the time domain and the frequency domain, and may include one or a plurality of continuous subcarriers in the frequency domain. The number of subcarriers included in the RB may be the same regardless of the numerology, for example, twelve. The number of subcarriers included in the RB may be determined based on the numerology.

Also, the time domain of the RB may include one or a plurality of symbols, and may have a length of 1 slot, 1 minislot, 1 subframe, or 1 TTI. The 1 TTI, the 1 subframe, or the like may be composed of one or more resource blocks.

Note that, one or more RBs may be called a physical resource block (Physical RB: PRB), a subcarrier group (Sub-Carrier Group: SCG), a resource element group (Resource Element Group: REG), PRB pair, RB pair, or the like.

The resource block may be configured by one or more resource elements (Resource Element: RE). For example, one RE may be a radio resource area of one subcarrier and one symbol.

A bandwidth part (BWP) (which may be called a partial bandwidth, etc.) may represent a subset of contiguous common resource blocks (RBs) for a certain neurology in a certain carrier. Here, the common RB may be specified by an index of the RB relative to the common reference point of the carrier. The PRB may be defined in BWP and numbered within that BWP.

The BWP may include UL BWP (UL BWP) and DL BWP (DL BWP). One or more BWPs may be configured in one carrier for the UE.

At least one of the configured BWPs may be active, and the UE may not expect to transmit and receive certain signals/channels outside the active BWP. Note that "cell," "carrier," and the like in this disclosure may be read as "BWP."

The above-described structures such as a radio frame, a subframe, a slot, a minislot, and a symbol are merely examples. For example, the number of subframes included in the radio frame, the number of slots per the subframe or the radio frame, the number of minislots included in the slot, the number of symbols and RBs included in the slot or the minislot, the number of subcarriers included in the RB, the number of symbols included in the TTI, a symbol length, a cyclic prefix (CP) length, and the like, can be changed in various manner.

The terms "connected," "coupled," or any variations thereof, mean any direct or indirect connection or coupling between two or more elements. Also, one or more intermediate elements may be present between two elements that are "connected" or "coupled" to each other. The coupling or connection between the elements may be physical, logical, or a combination thereof. For example, "connection" may be read as "access". In the present disclosure, two elements can be "connected" or "coupled" to each other by using one or more wires, cables, and printed electrical connections, and as some non-limiting and examples, non-exhaustive by using electromagnetic energy having wavelengths in a radio frequency region, a microwave region, and a light (both of visible and invisible) region, and the like.

A reference signal may be abbreviated as Reference Signal (RS), and may be called pilot (Pilot) according to applicable standards.

The phrase "based on" used in the present disclosure, does not mean "based only on" unless explicitly stated otherwise. In other words, the phrase "based on" means both "based only on" and "based at least on".

A "means" in a configuration of each device may be replaced with "unit", "circuit", "device", or the like.

Any reference to elements using designations such as "first" and "second" used in the present disclosure generally does not limit the amount or order of those elements. Such designations can be used in the present disclosure as a convenient way to distinguish between two or more elements. Thus, the reference to the first and second elements does not imply that only two elements can be adopted, or that the first element must precede the second element in some or the other manner.

In the present disclosure, the used terms "include", "including", and variants thereof are intended to be inclusive in a manner similar to the term "comprising". Furthermore, the term "or" used in the present disclosure is intended not to be an exclusive OR.

In the present disclosure, for example, if articles such as a, an, and the in English are added during translation, these articles shall include a plurality of nouns following these articles.

The terms "determining" and "deciding" used in this disclosure may encompass a wide variety of actions. The terms "determining" and "deciding" includes deeming that determining and deciding have been performed by, for example, judging, calculating, computing, processing, deriving, investigating, searching (looking up, search, inquiry) (e.g., searching in a table, database, or other data structure), ascertaining, and the like. Also, the terms "determining" and "deciding" includes deeming that determining and deciding have been performed by, for receiving example, (e.g., receiving information), transmitting (e.g., transmitting information), inputting (input), outputting (output), and accessing (e.g., accessing data in a memory), and the like. Further, the terms "determining" and "deciding" include deeming that determining and deciding have been performed by, for example, resolving, selecting, choosing, establishing, comparing, and the like. In other words, the terms "determining" and "deciding" include deeming that "determining" and "deciding" regarding some actions has the term been performed. Furthermore, "determining (deciding)" may be read as "assuming," "expecting," "considering," and the like.

In the present disclosure, the phrase "A and B are different" may mean "A and B are different from each other". Note that the phrase may mean "A and B are each different from C". Terms such as "leave," "coupled," and the like may also be interpreted in the same manner as "different."

Figure 17:
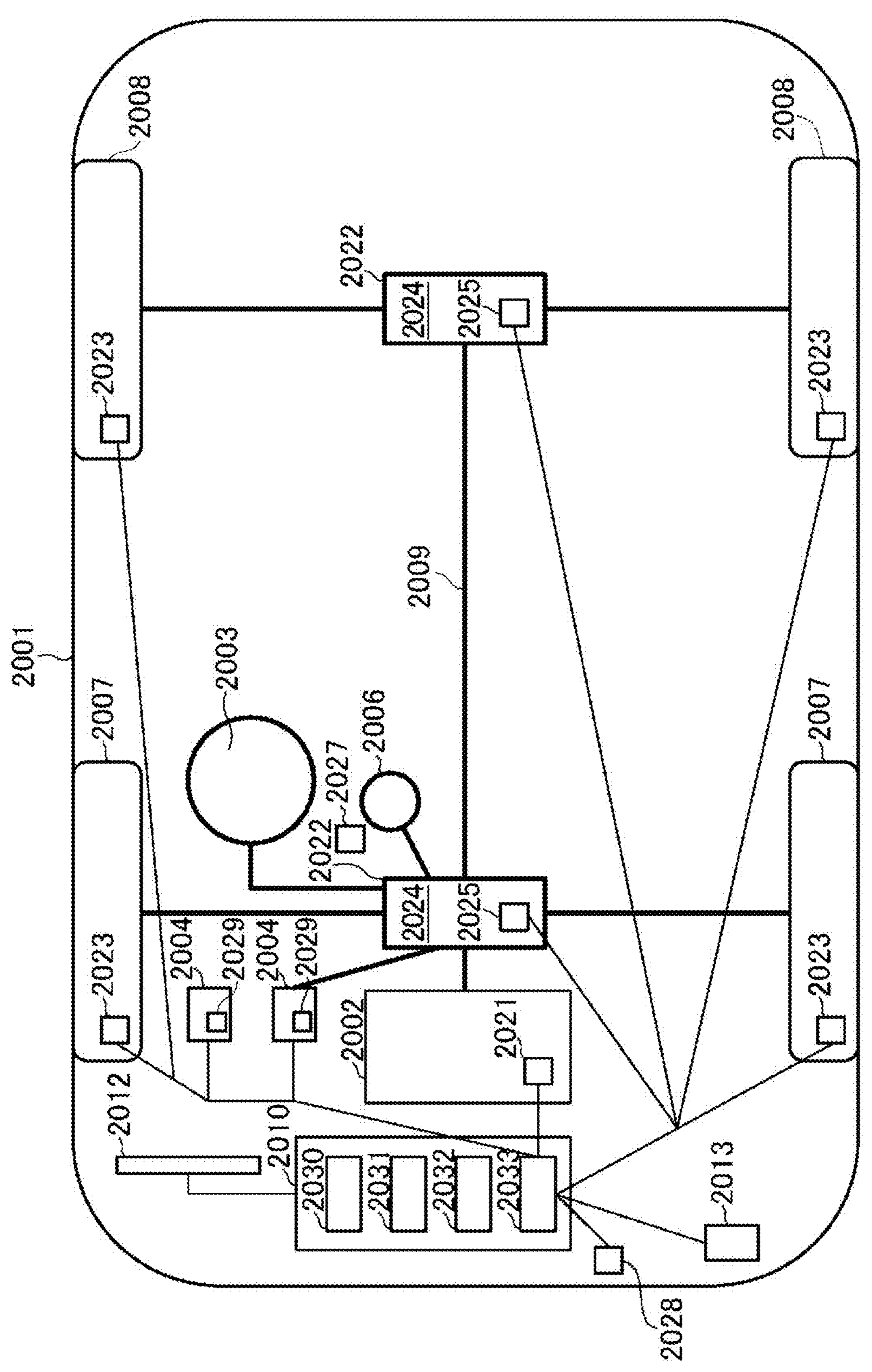
FIG. 17 is a diagram illustrating a configuration example of a vehicle 2001.

FIG. 17 illustrates a configuration example of a vehicle 2001. As illustrated in FIG. 17, the vehicle 2001 includes a drive unit 2002, a steering unit 2003, an accelerator pedal 2004, a brake pedal 2005, a shift lever 2006, left and right front wheels 2007, left and right rear wheels 2008, an axle 2009, an electronic control unit 2010, various sensors 2021 to 2029, an information service unit 2012, and a communication module 2013.

The drive unit 2002 includes, for example, an engine, a motor, and a hybrid of an engine and a motor.

The steering unit 2003 includes at least a steering wheel (also referred to as a handle), and is configured to steer at least one of front wheels and rear wheels, based on the operation of the steering wheel operated by a user.

The electronic control unit 2010 includes a microprocessor 2031, a memory (ROM, RAM) 2032, and a communication port (IO port) 2033. The electronic control unit 2010 receives signals from various sensors 2021 to 2027 provided in the vehicle. The electronic control unit 2010 may be called an ECU (electronic control unit).

The signals from the various sensors 2021 to 2028 include a current signal from a current sensor 2021 for sensing the current of a motor, a rotation speed signal of front wheels and rear wheels acquired by a rotation speed sensor 2022, a pressure signal of front wheels and rear wheels acquired by an air pressure sensor 2023, a vehicle speed signal acquired by a vehicle speed sensor 2024, an acceleration signal acquired by an acceleration sensor 2025, an accelerator pedal depression amount signal acquired by an accelerator pedal sensor 2029, a brake pedal depression amount signal acquired by a brake pedal sensor 2026, an operation signal of a shift lever acquired by a shift lever sensor 2027, and a detection signal, which is acquired by an object detection sensor 2028, for detecting obstacles, vehicles, pedestrians, and the like.

The information service unit 2012 includes: various devices such as a car navigation system, an audio system, a speaker, a television, and a radio for providing various information such as driving information, traffic information, and entertainment information; and one or more ECUs for controlling these devices. The information service unit 2012 provides various multimedia information and multimedia services to the occupants of the vehicle 1 by using information acquired from an external device via a communication module 2013 or the like.

A driving support system unit 2030 includes various devices for providing functions to prevent accidents or reduce the driver's driving load, such as a millimeter wave radar, light detection and ranging (LiDAR), a camera, a positioning locator (for example, GNSS), map information (for example, high-definition (HD) maps, autonomous vehicle (AV) maps, or the like), a gyroscopic system (for example, Inertial Measurement Unit (IMU), Inertial Navigation System (INS), or the like), an artificial intelligence (AI) chip, an AI processor, or the like; and one or more ECUs for controlling these devices. In addition, the driving support system unit 2030 transmits and receives various kinds of information via the communication module 2013 to realize a driving support function or an automatic driving function.

The communication module 2013 can communicate with the microprocessor 2031 and elements of the vehicle 1 via the communication port. For example, the communication module 2013 transmits and receives data via the communication port 2033 to and from the drive unit 2002, the steering unit 2003, the accelerator pedal 2004, the brake pedal 2005, the shift lever 2006, the right and left front wheels 2007, the right and left rear wheels 2008, the axle 2009, the microprocessor 2031 and the memory (ROM, RAM) 2032 in the electronic control unit 2010, and the sensors 2021 to 2028 all of which are provided in the vehicle 2001.

The communication module 2013 is a communication device that can be controlled by the microprocessor 2031 of the electronic control unit 2010, and can communicate with an external device. For example, the communication module

2013 transmits and receives various kinds of information with the external device by means of radio communication. The communication module 2013 may be provided inside or outside the electronic control unit 2010. The external device may be, for example, a base station, a mobile station, or the like.

The communication module 2013 transmits a current signal from a current sensor, which is input to the electronic control unit 2010, external device by means of radio communication. In addition, the communication module 2013 transmits to an external device by means of radio communication, a rotation speed signal of the front and rear wheels acquired by the rotation speed sensor 2022, an air pressure signal of the front and rear wheels acquired by the air pressure sensor 2023, a vehicle speed signal acquired by the vehicle speed sensor 2024, an acceleration signal acquired by the acceleration sensor 2025, an accelerator pedal depression amount signal acquired by the accelerator pedal sensor 2029, a brake pedal depression amount signal acquired by the brake pedal sensor 2026, a shift lever operation signal acquired by the shift lever sensor 2027, and a detection signal, which is acquired by the object detection sensor 2028, for detecting obstacles, vehicles, pedestrians, and the like. These signals are input to the electronic control unit 2010.

The communication module 2013 receives various pieces of information (traffic information, signal information, inter-vehicle information, and the like) transmitted from an external device, and displays them on the information service unit 2012 provided in the vehicle. The communication module 2013 also stores various pieces of information received from the external device in the memory 2032 usable by the microprocessor 2031. Based on the information stored in the memory 2032, the microprocessor 2031 may control the drive unit 2002, the steering unit 2003, the accelerator pedal 2004, the brake pedal 2005, the shift lever 2006, the left and right front wheels 2007, the left and right rear wheels 2008, the axle 2009, the sensors 2021 to 2028, and the like all of which are provided in the vehicle 2001.

Although the present disclosure has been described in detail above, it will be obvious to those skilled in the art that the present disclosure is not limited to the embodiments described in this disclosure. The present disclosure can be implemented as modifications and variations without departing from the spirit and scope of the present disclosure as defined by the claims. Therefore, the description of the present disclosure is for the purpose of illustration, and does not have any restrictive meaning to the present disclosure.

EXPLANATION OF REFERENCE NUMERALS

10 radio communication system
20 NG-RAN
100 gNB
110 receiving unit
120 transmitting unit
130 control unit
200 UE
210 radio signal transmitting and receiving unit
220 amplifier unit
230 modulation and demodulation unit
240 control signal and reference signal processing unit
250 encoding and decoding unit
260 data transmitting and receiving unit
270 control unit
1001 processor
1002 memory
1003 storage
1004 communication device
1005 input device
1006 output device
1007 bus
2001 vehicle
2002 drive unit
2003 steering unit
2004 accelerator pedal
2005 brake pedal
2006 shift lever
2007 left and right front wheels
2008 left and right rear wheels
2009 axle
2010 electronic control unit
2012 information service unit
2013 communication module
2021 current sensor
2022 rotation speed sensor
2023 air pressure sensor
2024 vehicle speed sensor
2025 acceleration sensor
2026 brake pedal sensor
2027 shift lever sensor
2028 object detection sensor
2029 accelerator pedal sensor
2030 driving support system unit
2031 microprocessor
2032 memory (ROM, RAM)
2033 communication port

The invention claimed is:

1. A terminal comprising:

a receiving unit that receives downlink control information (DCI) scrambled by a group-common Radio Network Temporary Identifier (RNTI) common to a plurality of terminals; and a control unit that performs scheduling of a downlink data channel for multicast in Multicast and Broadcast Services (MBS) in which data delivery to the plurality of terminals is performed, based on the DCI, wherein in the scheduling, the control unit assumes precoding granularity in physical resource block (PRB) bundling based on a configuration of Physical Downlink Shared Channel (PDSCH)-Config which is a higher layer parameter for the MBS, and in the scheduling, the control unit performs processing related to a modulation coding scheme using an MCS Index and an MCS table based on a configuration of the PDSCH-Config which is the higher layer parameter for the MBS.

2. The terminal according to claim 1, wherein in the scheduling, if prb-Bundlingtype is configured by the PDSCH-Config which is the higher layer parameter for the MBS, the control unit assumes the precoding granularity based on the prb-Bundlingtype, and in the scheduling, if prb-Bundlingtype is not configured by the PDSCH-Config which is the higher layer parameter for the MBS, the control unit assumes that the precoding granularity is equal to two consecutive resource blocks in a frequency domain.

3. The terminal according to claim 1, wherein in the scheduling, if an mcs-table is set to qam64LowSE by the PDSCH-Config which is the higher layer parameter for the MBS, the control unit performs the processing related to the modulation coding scheme using the MCS Index and the MCS table.

4. The terminal according to claim 1, wherein the control unit determines a resource allocation in a frequency domain using the DCI based on a configuration of the PDSCH-Config which is the higher layer parameter for the MBS.

5. The terminal according to claim 1, wherein the control unit assumes that a TCI field is present in the DCI based on a configuration of another higher layer parameter for the MBS.

6. A base station comprising:

a first transmitting unit that transmits downlink control information (DCI) scrambled by a group-common Radio Network Temporary Identifier (RNTI) common to a plurality of terminals;

a second transmitting unit that transmits Physical Downlink Shared Channel (PDSCH)-Config which is a higher layer parameter for Multicast and Broadcast Services (MBS) in which data delivery to the plurality of terminals is performed; and a control unit that causes a terminal to assume precoding granularity in physical resource block bundling based on a configuration of the PDSCH-Config which is the higher layer parameter for the MBS when the terminal performs scheduling of a downlink data channel for multicast in the MBS based on the DCI, wherein the control unit causes the terminal to perform processing related to a modulation coding scheme using an MCS Index and an MCS table based on a configuration of the PDSCH-Config which is the higher layer parameter for the MBS, in the scheduling.

7. A radio communication system comprising a terminal, and a base station, wherein the terminal include:

a receiving unit that receives downlink control information (DCI) scrambled by a group-common Radio Network Temporary Identifier (RNTI) common to a plurality of terminals; and a control unit that performs scheduling of a downlink data channel for multicast in Multicast and Broadcast Services (MBS) in which data delivery to the plurality of terminals is performed, based on the DCI, wherein in the scheduling, the control unit assumes precoding granularity in physical resource block bundling based on a configuration of Physical Downlink Shared Channel (PDSCH)-Config which is a higher layer parameter for the MBS, in the scheduling, the control unit performs processing related to a modulation coding scheme using an MCS Index and an MCS table based on a configuration of the PDSCH-Config which is the higher layer parameter for the MBS, and the base station includes a transmitting unit that transmits the DCI.

8. A radio communication method comprising:

step of receiving, by a terminal, downlink control information (DCI) scrambled by a group-common Radio Network Temporary Identifier (RNTI) common to a plurality of terminals; and a step of performing, by the terminal, scheduling of a downlink data channel for multicast in Multicast and Broadcast Services (MBS) in which data delivery to the plurality of terminals is performed, based on the DCI, wherein in the step of performing the scheduling, the terminal assumes precoding granularity in physical resource block bundling based on a configuration of Physical Downlink Shared Channel (PDSCH)-Config which is a higher layer parameter for the MBS, and in the step of performing the scheduling, the terminal performs processing related to a modulation coding scheme using an MCS Index and an MCS table based on a configuration of the PDSCH-Config which is the higher layer parameter for the MBS.

* * * * *